United States Patent
Yamada

(10) Patent No.: US 9,838,386 B2
(45) Date of Patent: Dec. 5, 2017

(54) INFORMATION PROCESSING SYSTEM, INFORMATION PROCESSING DEVICE, AND DEVICE CONTROL METHOD

(71) Applicant: Kazuhiro Yamada, Kanagawa (JP)

(72) Inventor: Kazuhiro Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 217 days.

(21) Appl. No.: 14/837,168

(22) Filed: Aug. 27, 2015

(65) Prior Publication Data

US 2016/0072925 A1    Mar. 10, 2016

(30) Foreign Application Priority Data

Sep. 10, 2014   (JP) .................................. 2014-183977

(51) Int. Cl.

| | | |
|---|---|---|
| *H04L 29/06* | (2006.01) | |
| *H04N 1/00* | (2006.01) | |
| *H04N 1/44* | (2006.01) | |
| *H04N 1/32* | (2006.01) | |
| *H04L 12/28* | (2006.01) | |

(52) U.S. Cl.
CPC ........ *H04L 63/083* (2013.01); *H04L 12/2809* (2013.01); *H04N 1/00244* (2013.01); *H04N 1/00307* (2013.01); *H04N 1/32534* (2013.01); *H04N 1/4413* (2013.01); *H04L 2012/2841* (2013.01); *H04L 2012/2849* (2013.01); *H04N 2201/0075* (2013.01); *H04N 2201/0094* (2013.01); *H04N 2201/3201* (2013.01)

(58) Field of Classification Search
CPC ....... H04N 2201/0039; H04N 1/00244; H04N 2201/3205; H04N 1/00233
See application file for complete search history.

(56) References Cited

U.S. PATENT DOCUMENTS

| | | |
|---|---|---|
| 8,103,744 B2 | 1/2012 | Yoshihara et al. |
| 2002/0131569 A1 | 9/2002 | Ito et al. |
| 2004/0130568 A1* | 7/2004 | Nagano ................. G06F 3/1454 715/733 |
| 2006/0098174 A1* | 5/2006 | Ohuchi ................. H04M 3/567 353/122 |

(Continued)

FOREIGN PATENT DOCUMENTS

| | | |
|---|---|---|
| JP | 2004-096591 | 3/2004 |
| JP | 2006-129184 | 5/2006 |

(Continued)

*Primary Examiner* — Dung Hong
(74) *Attorney, Agent, or Firm* — IPUSA, PLLC

(57) ABSTRACT

An information processing system includes terminal devices of a first network; and an information processing device of a second network. A first terminal device includes a unit for retrieving device information of electronic devices and the information processing device of the second network; and a unit for transmitting an output request to the information processing device. A second terminal device includes a unit for retrieving device information of the electronic devices and the information processing device; and a unit for transmitting a retrieval request to the information processing device, and for retrieving electronic data. The information processing device includes a unit for retrieving the output request and the retrieval request; a unit for transmitting the output request and the retrieval request to the electronic device, and for receiving the electronic data; and a unit for providing the electronic data to the second terminal.

10 Claims, 21 Drawing Sheets

(56) References Cited

U.S. PATENT DOCUMENTS

| | | | | |
|---|---|---|---|---|
| 2010/0265544 A1* | 10/2010 | Anezaki | ............... | G06F 3/1204 358/1.15 |
| 2011/0194140 A1* | 8/2011 | Sweet | ................... | G06F 3/1204 358/1.15 |
| 2012/0162687 A1* | 6/2012 | Hattori | ................. | G06F 3/1204 358/1.13 |
| 2012/0287469 A1* | 11/2012 | Tomiyasu | .......... | H04N 1/00244 358/1.15 |
| 2013/0067037 A1* | 3/2013 | Yoshida | ........... | H04N 21/47202 709/219 |
| 2013/0229690 A1* | 9/2013 | Sumita | .............. | H04N 1/00127 358/1.15 |
| 2014/0016161 A1 | 1/2014 | Yamada | | |
| 2014/0016816 A1 | 1/2014 | Yamada | | |
| 2014/0185082 A1 | 7/2014 | Yamada | | |
| 2015/0015908 A1* | 1/2015 | Tanaka | ............... | G06K 15/4095 358/1.14 |
| 2015/0080025 A1 | 3/2015 | Yamada | | |
| 2015/0082423 A1 | 3/2015 | Yamada | | |

FOREIGN PATENT DOCUMENTS

| | | |
|---|---|---|
| JP | 2006-203516 | 8/2006 |
| JP | 4359004 | 11/2009 |
| JP | 4589696 | 12/2010 |
| JP | 4600992 | 12/2010 |
| JP | 2011-244499 | 12/2011 |
| JP | 4868028 | 2/2012 |
| JP | 2014-014187 | 1/2014 |
| JP | 2014-016896 | 1/2014 |

* cited by examiner

FIG.8

| INFORMATION | | EXAMPLE OF SETTING |
|---|---|---|
| INFORMATION STORAGE DEVICE | IP ADDRESS | 192.168.0.10 |
| | HOST NAME | NAS1 |
| | MAC ADDRESS | 00-00-00-00-00-AA |
| | DEVICE TYPE | NAS1 |
| | INFORMATION STORAGE DEVICE ID | 00-00-00-00-00-AA |
| PROJECTOR | IP ADDRESS | 192.168.0.10 |
| | HOST NAME | PROJECTOR 1 |
| | MAC ADDRESS | 00-00-00-00-00-AA |
| | DEVICE TYPE | PJS1 |
| IWB | IP ADDRESS | 192.168.0.11 |
| | HOST NAME | IWB1 |
| | MAC ADDRESS | 00-00-00-00-00-AB |
| | DEVICE TYPE | IWB1 |
| MFP | IP ADDRESS | 192.168.0.12 |
| | HOST NAME | MFP1 |
| | MAC ADDRESS | 00-00-00-00-00-AC |
| | DEVICE TYPE | MFP1 |
| CONFERENCE ROOM | | room1 |

FIG.10

| INFORMATION | EXAMPLE OF SETTING |
|---|---|
| IP ADDRESS | 192.168.0.10 |
| HOST NAME | PROJECTOR 1 |
| MAC ADDRESS | 00-00-00-00-00-AA |
| DEVICE TYPE | PJS1 |
| CONFERENCE ROOM | room1 |

| INFORMATION | EXPLANATION |
|---|---|
| INFORMATION STORAGE DEVICE ID | ID FOR IDENTIFYING THE INFORMATION STORAGE DEVICE |
| DEVICE CONNECTION INFORMATION | IP ADDRESS AND HOST NAME THAT ARE FOR ESTABLISHING NETWORK CONNECTION TO DEVICE |
| REQUEST COMMAND | REQUEST COMMAND FOR EXECUTING IF FUNCTION THAT IS PROVIDED BY THE DEVICE |

| DEVICE TYPE | OUTPUT TYPE | RETRIEVAL TYPE |
|---|---|---|
| PJS1 | PROJECTION BY PROJECTOR | PJS RETRIEVAL |
| IWB1 | IWB DISPLAY | IWB RETRIEVAL |
| MFP1 | PRINTING | SCANNING |
| PRT1 | PRINTING | × |
| ⋮ | ⋮ | ⋮ |

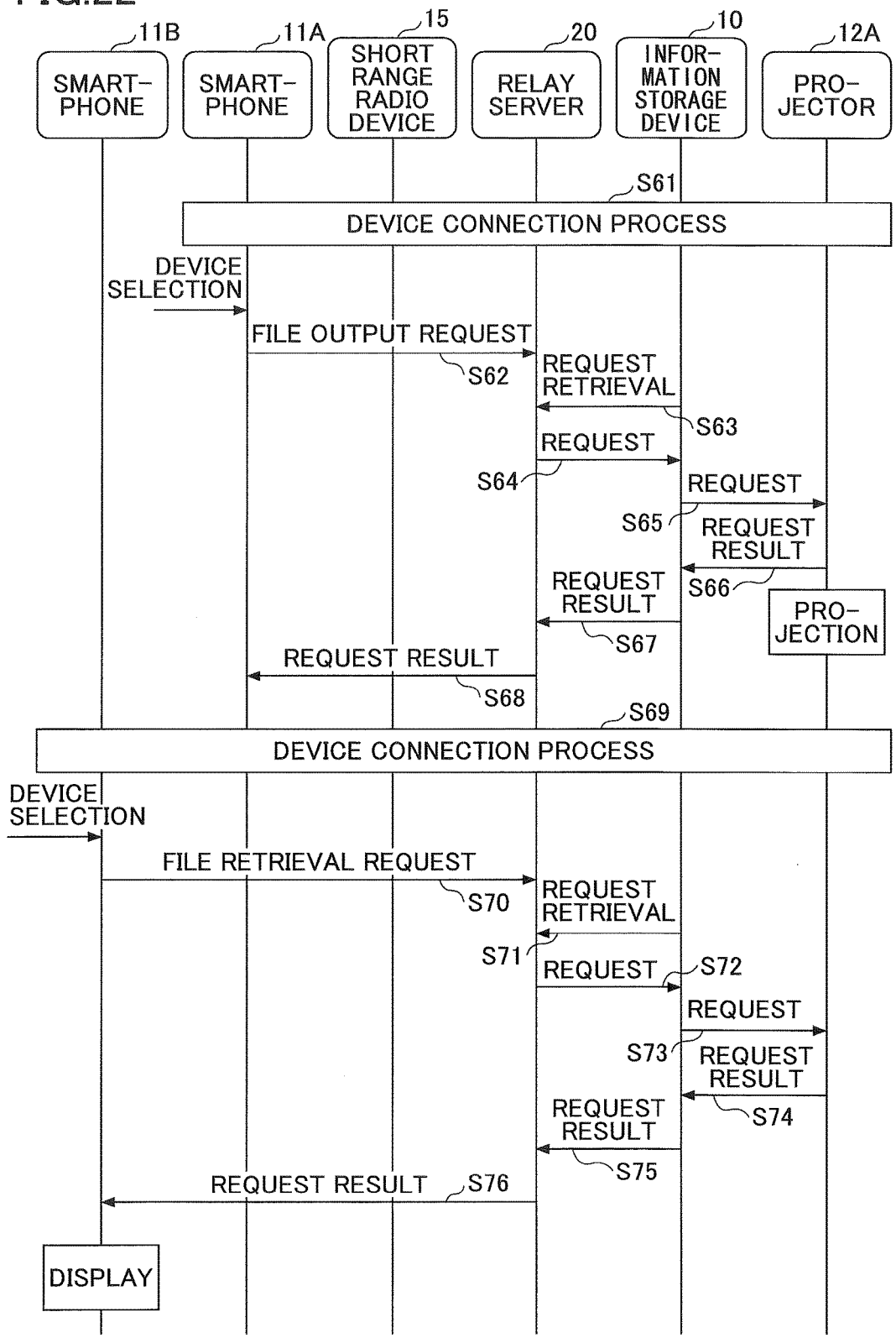

FIG.23

| INFORMATION | EXPLANATION |
|---|---|
| PASSWORD INFORMATION | PASSWORD INFORMATION FOR ACCESSING INFORMATION STORAGE DEVICE |
| INFORMATION STORAGE DEVICE ID | ID FOR IDENTIFYING INFORMATION STORAGE DEVICE |
| INFORMATION STORAGE DEVICE AUTHENTICATION INFORMATION | AUTHENTICATION INFORMATION FOR ACCESSING INFORMATION STORAGE DEVICE |
| REQUEST COMMAND | REQUEST COMMAND FOR EXECUTING IF FUNCTION THAT IS PROVIDED BY DEVICE |

FIG.24

| INFORMATION | EXPLANATION |
|---|---|
| LOCATION INFORMATION | INFORMATION FOR SPECIFYING LOCATION OF SMARTPHONE |
| INFORMATION STORAGE DEVICE ID | ID FOR IDENTIFYING INFORMATION STORAGE DEVICE |
| INFORMATION STORAGE DEVICE AUTHENTICATION INFORMATION | AUTHENTICATION INFORMATION FOR ACCESSING INFORMATION STORAGE DEVICE |
| REQUEST COMMAND | REQUEST COMMAND FOR EXECUTING IF FUNCTION THAT IS PROVIDED BY DEVICE |

INFORMATION PROCESSING SYSTEM, INFORMATION PROCESSING DEVICE, AND DEVICE CONTROL METHOD

BACKGROUND OF THE INVENTION

1. Field of the Invention

The present invention relates to an information processing system, an information processing device, and a device control method.

2. Description of the Related Art

A remote operation system has been known in the past such that a home appliance that is installed inside a house and a communication controller for controlling the appliance are connected to a public telephone line, so that the home appliance that is located inside the house can be controlled from a communication terminal that is located outside the house via the public telephone line (cf., Patent Document 1 (Japanese Unexamined Patent Publication No. 2004-96591), for example).

SUMMARY OF THE INVENTION

An electronic device, such as a printer, a multifunction peripheral, and a projector, can be connected to a network, such as a local area network (LAN), so that the electronic device can be controlled from various types of terminal devices that can be used by a user, such as a mobile telephone, a smartphone, and a tablet terminal, via the network.

However, for a case in which a network, such as a LAN to which an electronic device such as a printer, a multifunction peripheral, and a projector, is connected, is a network of a rental office or the like, a user's personal terminal device may not be allowed to connect to the network. In this manner, a terminal device that is used by a user may not be allowed to connect to a network to which an electronic device is connected, and the electronic device may not be controlled through the network.

There is a need for an information processing system, an information processing device, and a device control method that allows an electronic device to be controlled from a terminal device that may not be connected to a network to which the electronic device is connected.

According to an aspect of the present invention, there is provided an information processing system including a plurality of terminal devices that are connected to a first network, and an information processing device that is connected to a second network that is different from the first network. A first terminal device among the plurality of the terminal devices includes a first device information retrieval unit configured to retrieve device information of one or more electronic devices and device information of the information processing device from a device information storage device that stores the device information of the one or more electronic devices and the device information of the information processing device that are connected to the second network; a first receiver configured to receive, from a user, selection of one electronic device among the one or more electronic devices for which the device information is to be retrieved; and an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device. A second terminal device among the plurality of terminal devices includes a second device information retrieval unit configured to retrieve the device information of the one or more electronic devices and the device information of the information processing device from the device information storage device; a second receiver configured to receive, from a user, selection of the one electronic device that is to output the electronic data based on the output request, among the one or more electronic devices for which the device information is retrieved; and a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device. The information processing device includes a request retrieving unit configured to retrieve, from the relay device, the output request for the electronic data that is addressed to the one electronic device and the retrieval request for the electronic data that is addressed to the one electronic device; an electronic device request unit configured to transmit, to the one electronic device, the retrieved output request for the electronic data that is addressed to the one electronic device, configured to transmit, to the one electronic device, the retrieved retrieval request for the electronic data that is addressed to the one electronic device, and configured to receive, from the one electronic device, the electronic data that is output from the one electronic device; and an electronic data providing unit configured to provide the electronic data that is received from the one electronic device to the second terminal device.

According to another aspect of the present invention, there is provided an information processing device that is connected to a second network that is different from a first network to which a plurality of terminal devices are connected, wherein a first terminal device among the plurality of the terminal devices includes a first device information retrieval unit configured to retrieve device information of one or more electronic devices and device information of the information processing device from a device information storage device that stores the device information of the one or more electronic devices and the device information of the information processing device that are connected to the second network; a first receiver configured to receive, from a user, selection of one electronic device among the one or more electronic devices for which the device information is to be retrieved; and an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device, wherein a second terminal device among the plurality of terminal devices includes a second device information retrieval unit configured to retrieve the device information of the one or more electronic devices and the device information of the information processing device from the device information storage device; a second receiver configured to receive, from a user, selection of the one electronic device that is to output the electronic data based on the output request, among the one or more electronic devices for which the device information is retrieved; and a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device, and wherein the information processing device includes a request retrieving unit configured to retrieve, from the relay device, the output request for the electronic data that is addressed to the one electronic device and the retrieval request for the electronic data that is addressed to the one electronic device; an electronic device request unit configured to transmit, to the one electronic device, the retrieved output request for the electronic data that is addressed to the one electronic device, configured to transmit, to the one electronic device, the retrieved retrieval request for the electronic data that is addressed to the one electronic device, and configured to receive, from the one electronic device, the electronic data that is output from the one electronic device; and an electronic data providing unit configured to provide the electronic data that is received from the one electronic device to the second terminal device.

According to another aspect of the present invention, there is provided a device control method that is to be executed by an information processing device that is connected to a second network that is different from a first network to which a plurality of terminal devices are connected, wherein a first terminal device among the plurality of the terminal devices includes a first device information retrieval unit configured to retrieve device information of one or more electronic devices and device information of the information processing device from a device information storage device that stores the device information of the one or more electronic devices and the device information of the information processing device that are connected to the second network; a first receiver configured to receive, from a user, selection of one electronic device among the one or more electronic devices for which the device information is to be retrieved; and an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device, wherein a second terminal device among the plurality of terminal devices includes a second device information retrieval unit configured to retrieve the device information of the one or more electronic devices and the device information of the information processing device from the device information storage device; a second receiver configured to receive, from a user, selection of the one electronic device that is to output the electronic data based on the output request, among the one or more electronic devices for which the device information is retrieved; and a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device, and wherein the device control method includes an output request retrieval step of retrieving, from the relay device, the output request for the electronic data that is addressed to the one electronic device; an output request step of transmitting, to the one electronic device, the retrieved output request for the electronic data that is addressed to the one electronic device; a retrieval request retrieval step of retrieving, from the relay device, the retrieval request for the electronic data that is addressed to the one electronic device; an electronic data receiving step of transmitting, to the one electronic device, the retrieved retrieval request for the electronic data that is addressed to the one electronic device, and receiving, from the one electronic device, the electronic data that is output from the one electronic device; and an electronic data providing step of providing the electronic data that is provided by the one electronic device to the second terminal device.

According to an embodiment of the present invention, an electronic device that is connected to a network can be controlled from a terminal device, even if the terminal device may not be connected to the network to which the electronic device is connected.

Other objects, features and advantages of the present invention will become more apparent from the following detailed description when read in conjunction with the accompanying drawings.

BRIEF DESCRIPTION OF THE DRAWINGS

FIG. 8 is a diagram showing an example of device information that is stored in a short range radio device;

FIG. 10 is a diagram of an example of device information that is stored in a short range radio device;

FIG. 14 is an image diagram showing an example of a file display screen in a state in which a button for making a file output request to an electronic device can be selected;

FIG. 20 is a diagram showing an example of a table that defines correspondence among a device type, an output type, and a retrieval type of the electronic device;

FIG. 22 is a sequence diagram of an example of the file output process and the file retrieval process in the cooperation processing system according to the embodiment;

FIG. 23 is a diagram showing another example of the file output request; and

FIG. 24 is a diagram showing another example of the file output request.

DETAILED DESCRIPTION OF THE PREFERRED EMBODIMENTS

Hereinafter, an embodiment of the present invention is explained in detail. A cooperation processing system according to the embodiment is an example of an information processing system.

[First Embodiment]
<System Configuration>

Figure 1:
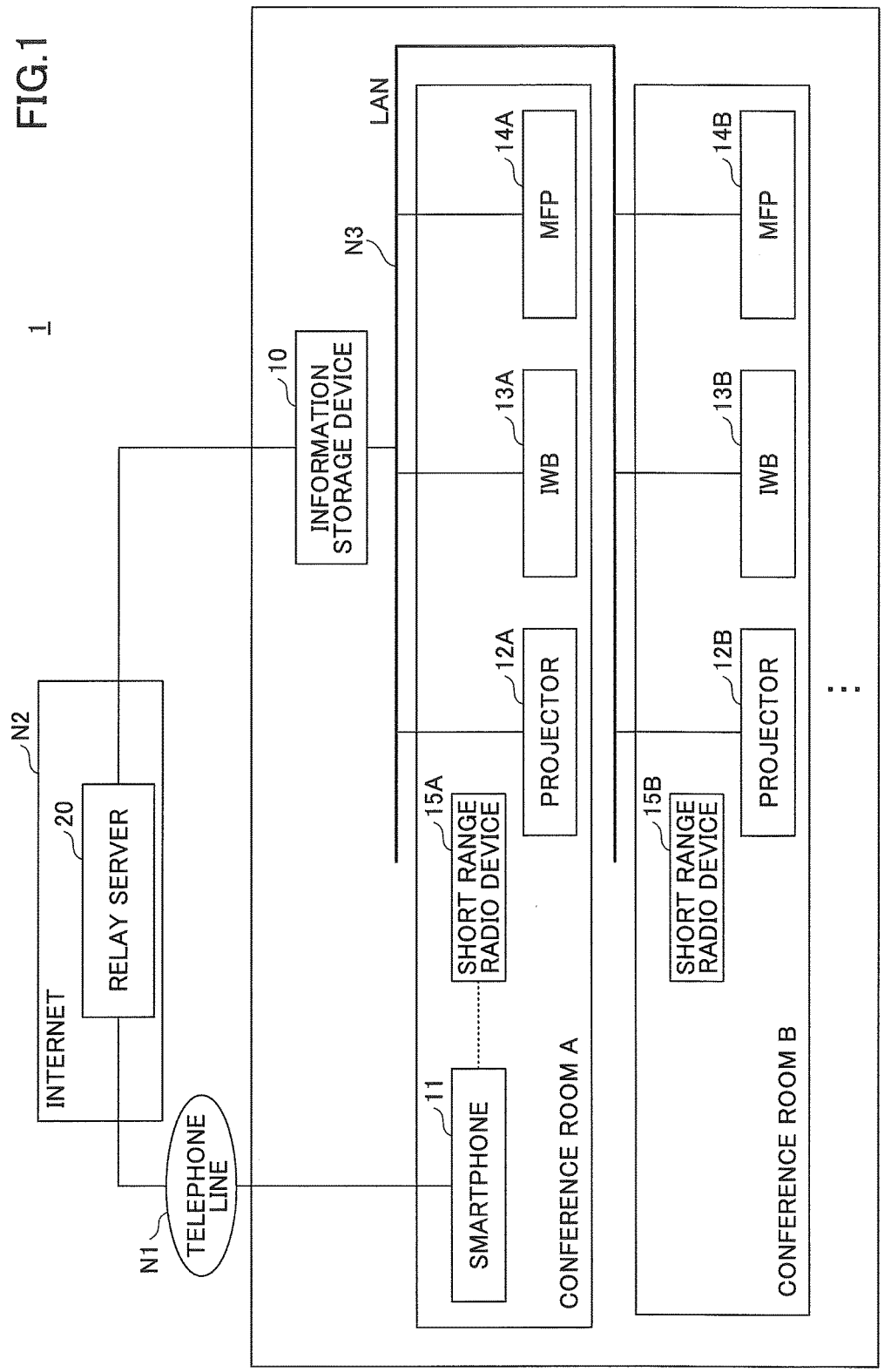
FIG. 1 is a diagram showing an example of a configuration of a cooperation processing system according to an embodiment.

FIG. 1 is a diagram showing an example of a configuration of the cooperation processing system according to the embodiment. FIG. 1 shows an example of a configuration of the cooperation processing system 1 that includes an information storage device 10; a smartphone 11; projectors 12A and 12B; interactive whiteboards (which are referred to as the IWBs, hereinafter) 13A and 13B; multifunction peripherals (MFPs) 14A and 14B; short range radio devices 15A and 15B; and a relay server 20.

In the cooperation processing system 1, the information storage device 10, the projectors 12A and 12B, the IWBs 13A and 13B, and the MFPs 14A and 14B are connected to a network N3, such as a LAN. Further, in the cooperation processing system 1, the information storage device 10 can be connected to a network N2, such as the Internet.

Note that, in the cooperation processing system 1 of FIG. 1, the projector 12A, the IWB 13A, the MFP 14A, and the short range radio device 15A are installed in a conference room A of a rental office. Additionally, the cooperation processing system of FIG. 1 shows an example in which the projector 12B, the IWB 13B, the MFP 14B, and the short range radio device 15B are installed in a conference room B of a rental office. Here, a rental office is an example of an office that can be temporarily used by a user.

Further, the cooperation processing system 1 includes the relay server 20 that is connected to the network N2, such as the Internet. Additionally, the cooperation processing system 1 includes the smartphone 11 that can be connected to a network N1, such as a telephone line. The smartphone 11 can be connected, by using the network N1, to the relay server 20 that is connected to the network N2. Additionally, the information storage device 10 can be connected to the relay server 20 that is connected to the network N2.

As for the network N1, a telephone line, such as a 3G network, can be used. The network N3 is a network, such as a LAN, that is installed in the rental office. The relay server 20 that is connected to the network N2 can be omitted, if the smartphone 11 can be directly connected to the information storage device 10 via the networks N1 and N2.

The information storage device 10 can be connected to the relay device 20, so that the information storage device 10 can execute a process for receiving a request from the smartphone 11. The information storage device 10 can be distributed over a plurality of computers.

The smartphone 11 is an example of a terminal device that can be operated by a user. Note that the terminal device is not limited to the smartphone 11. For example, the terminal device can be a mobile telephone, a laptop personal computer, or a tablet terminal, provided that it can be operated by a user.

The projectors 12A and 12B, the IWBs 13A and 13B, and the MFPs 14A and 14B are examples of an electronic device that can be operated from the smartphone 11. The projectors 12A and 12B, the IWBs 13A and 13B, and the MFPs 14A and 14B provide corresponding interfaces (IF) that are for connecting to the network N3.

The projectors 12A and 12B are examples of an image projecting device. Note that, for referring to any one of the projectors 12A and 12B, the any one of the projectors 12A and 12B can be simply referred to as the projector 12. The projector 12 may include a projection function and a communication function.

The IWB 13A and 13B are examples of an image display device. Note that, for referring to any one of the IWBs 13A and 13B, the any one of the IWBs 13A and 13B can be simply referred to as the IWB 13. The IWB 13 may include a display function and a communication function. The MFPs 14A and 14B are examples of an image forming device. Note that, for referring to any one of the MFPs 14A and 14B, the any one of the MFPs 14A and 14B can be simply referred to as the MFP 14. The MFP 14 may include an image capturing function, an image forming function, and a communication function. The MFP 14 can be used as a printer, a facsimile machine, a scanner, and a copier, for example.

The short range radio devices 15A and 15B can provide, by using a short range radio communication standard, such as the Bluetooth (the registered trademark) standard, or a Near Field Communication (NFC) standard, device information, which is described below, to the smartphone 11. Note that, for referring to any one of the short range radio devices 15A and 15B, the any one of the short range radio devices 15A and 15B can be simply referred to as the short range radio device 15.

Figure 2:
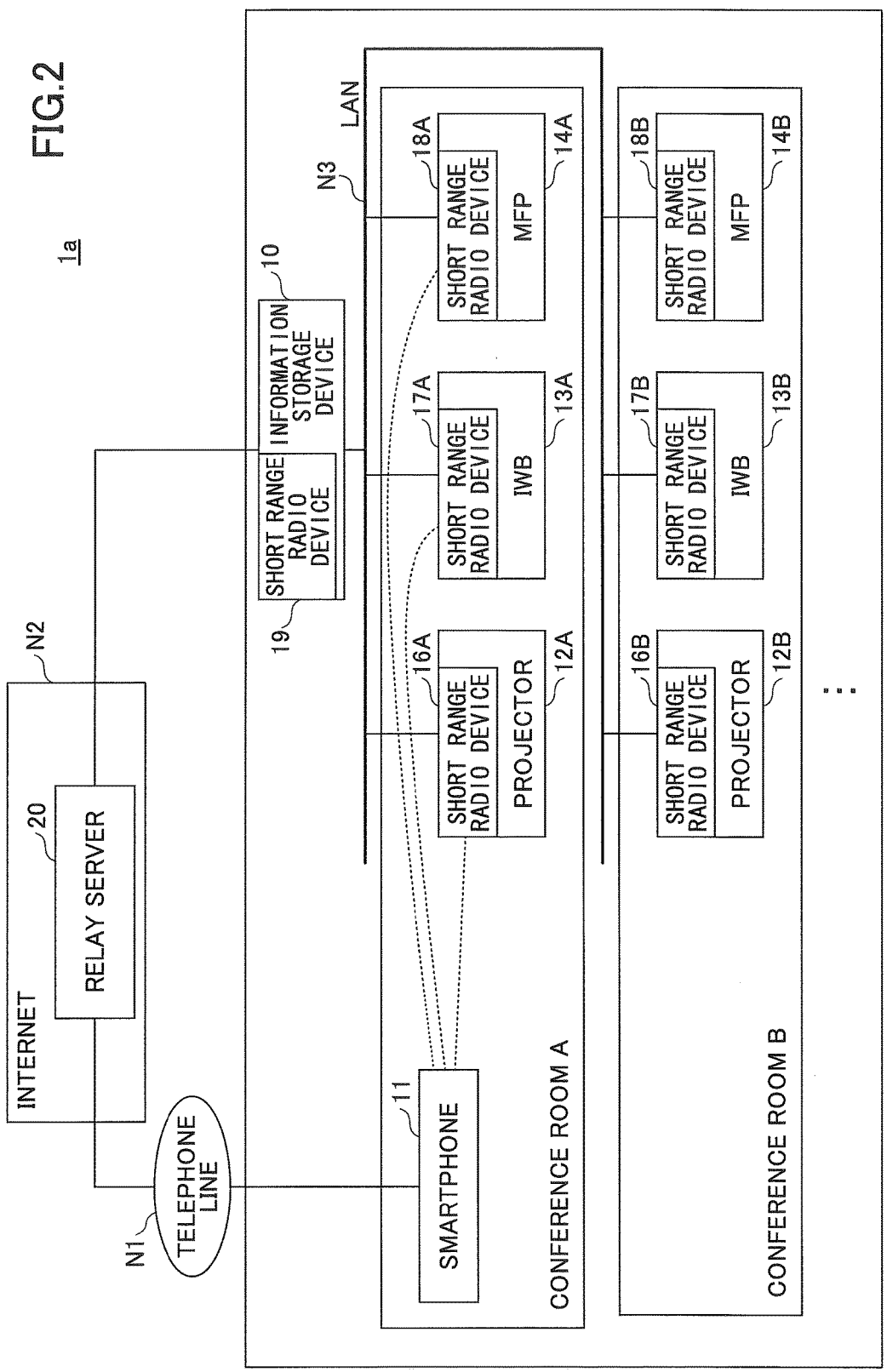
FIG. 2 is a diagram showing another example of the configuration of the cooperation processing system according to the embodiment.

In FIG. 1, one of the short range radio devices 15 is installed in each of the conference rooms A and B. Alternatively or additionally, as shown in FIG. 2, one of the short range radio devices 15 can be provided in the information storage device 10, and at the same time, the short range radio devices 15 can be provided in the projector 12, the IWB 13, and the MFP 14, respectively, that are installed in each of the conference rooms A and B. FIG. 2 is a diagram showing another example of the configuration of the cooperation processing system 1a according to the embodiment.

In the cooperation processing system 1a, the short range radio devices 16A, 17A, and 18A are included in the projector 12A, the IWB 13A, and the MFP 14A, respectively. Additionally, the short range radio devices 16B, 17B, and 18B are included in the projector 12B, the IWB 13B, and the MFP 14B, respectively. The short range radio device 19 is included in the information storage device 10.

The cooperation processing system 1 of FIG. 1 and the cooperation processing system 1a of FIG. 2 show examples in which the smartphone 11 is located inside the conference room A. For example, the smartphone 11 that is located inside the cooperation processing system 1 of FIG. 1 can retrieve the device information, which is described below, from the short range radio device 15A. The smartphone 11 that is located inside the cooperation processing system 1a of FIG. 2 can retrieve the device information, which is described below, from the short range radio devices 16A, 17A, 18A, and 19.

<Hardware Configuration>
<<Computer>>

Figure 3:
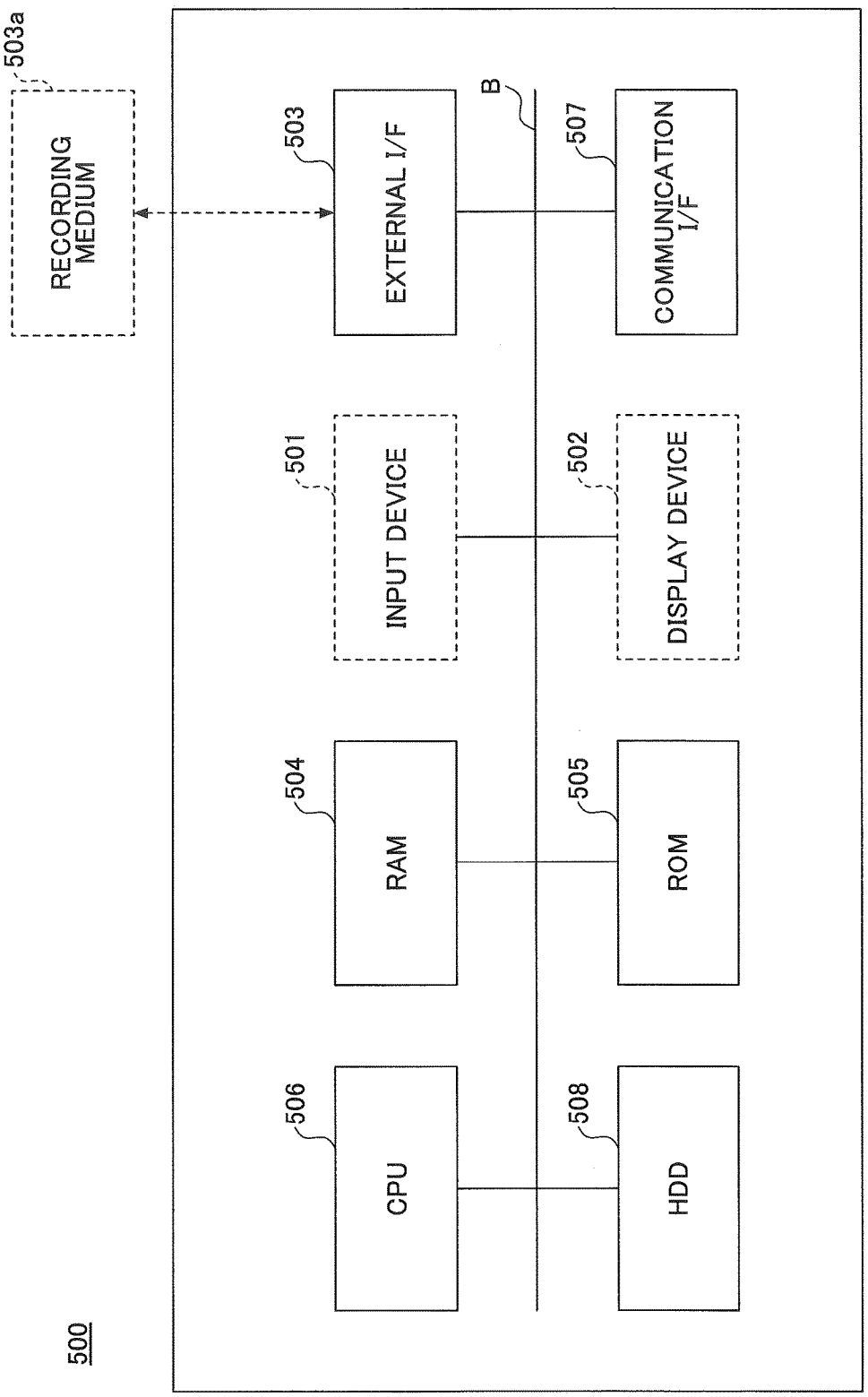
FIG. 3 is a diagram showing an example of a hardware configuration of a computer according to the embodiment.

The information storage device 10 and the relay server 20 can be achieved, for example, by a computer having a hardware configuration, such as shown in FIG. 3. FIG. 3 is a diagram showing an example of the hardware configuration of the computer according to the embodiment.

The computer 500 of FIG. 3 may include an input device 501; a display device 502; an external interface (I/F) 503; a random access memory (RAM) 504, a read-only memory (ROM) 505; a central processing unit (CPU) 506; a communication interface (I/F) 507; a hard disk drive (HDD) 508, and so forth, and they can be mutually connected by a bus B. Note that the input device 501 and the display device 502 can be configured such that they are connected and used when they are necessary.

The input device 501 may include a keyboard; a mouse; and a touch panel. The input device 501 can be used by a user to input various operation signals.

The display device 502 may include a display or the like. The display device 502 can display a processing result by the computer 500.

The communication I/F 507 is an interface that is for connecting the computer 500 to various types of networks. The computer 500 can execute data communication through the communication I/F 507.

The HDD 508 is an example of a non-volatile storage device that stores a program and data. The program and the data that can be stored in the HDD 508 may include an operating system (OS) that is the system software for controlling the entire computer 500, and application software (which is simply referred to as the application, hereinafter) that can provide various functions on the OS. Note that the computer 500 may use, instead of the HDD 508, a drive device (e.g., a solid state drive (SSD)) that uses a flash memory as a storage medium.

The external I/F 503 is an interface to an external device. The external device may include a recording medium 503a, for example. The computer 500 can read data from the recording medium 503a and write data in the recording medium 503a through the external I/F 503. Examples of the recording medium 503a may include a flexible disk, a compact disk (CD), a digital versatile disk (DVD), a Secure Digital (SD) memory card, a universal serial bus (USB) memory, and so forth.

The ROM 505 is an example of a non-volatile semiconductor memory (storage device) that can maintain a program and data even if the power supply is turned off. The ROM 505 may store a program and data, such as a basic input/output system (BIOS) that is to be executed during activation of the computer 500, a setting of the OS, and a setting of a network. The RAM 504 is an example of a volatile semiconductor memory (storage device) that can temporarily maintain a program and data.

The CPU 506 is a processor that is for controlling the entire computer 500 and for achieving functions of the computer 500 by reading out a program and data from a storage device, such as the ROM 505 or the HDD 508, onto the RAM 504, and by executing a process.

The information storage device 10 and the relay server 20 can achieve various types of processes, which are described below, by the hardware configuration of the computer 500 that is shown in FIG. 3, for example.

<<Terminal Device>>

Figure 4:
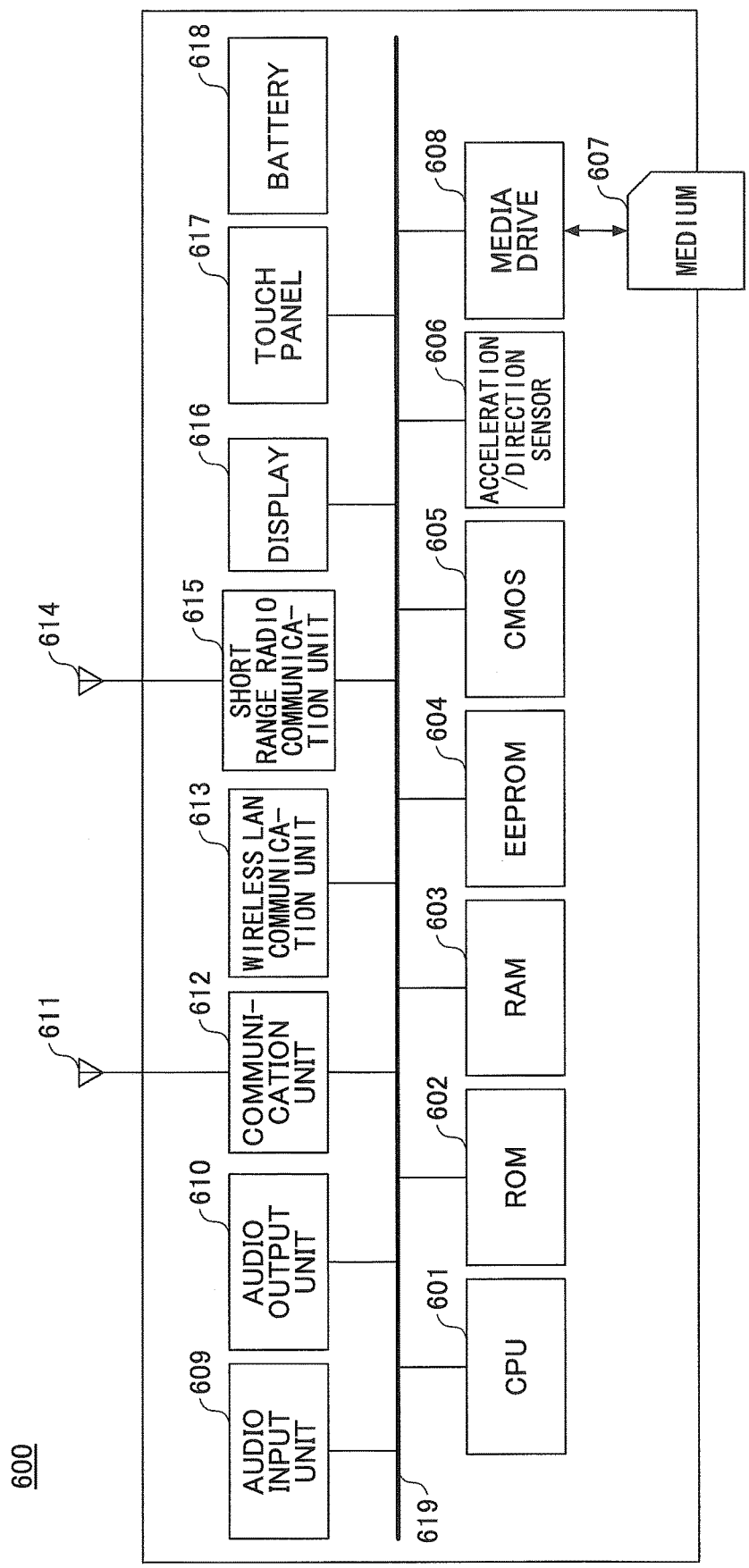
FIG. 4 is a diagram showing an example of a hardware configuration of a terminal device according to the embodiment.

The smartphone 11 can be achieved by a hardware configuration that is shown in FIG. 4, for example. FIG. 4 is a diagram showing an example of a hardware configuration of the terminal device according to the embodiment. The terminal device 600 of FIG. 4 may include a CPU 601; a ROM 602; a RAM 603; an EEPROM 604; a CMOS sensor 605; an acceleration/direction sensor 606; and a media drive 608, for example.

The CPU 601 can control the entire terminal device 600. The ROM 602 can store a basic input/output program. The RAM 603 can be used as a work area of the CPU 601. The EEPROM 604 can read and write data in accordance with control by the CPU 601. The CMOS sensor 605 can take an image of an object in accordance with control of the CPU 601, and the COMS sensor 605 can obtain image data. The acceleration/direction sensor 606 can be an electromagnetic compass for detecting terrestrial magnetism, a gyrocompass, an acceleration sensor, or the like.

The media drive 608 is for controlling reading data from and writing (storing) data in the recording medium 607, such as a flash memory. The media drive 608 can be configured such that the recording medium 607, from which the recorded data can be read out or in which new data can be written, can be detachably attached.

Note that the EEPROM 604 may store the OS that is to be executed by the CPU 601; association information that may be required for network setting; and the like. The application for executing various types of processes of the embodiment of the present invention can be stored in the EEPROM 604 or the recording medium 607, for example.

The CMOS sensor 605 is a charge coupled device that is for converting an image of an object into an electronic form by converting light into electric charges. The CMOS sensor 605 can be a Charge Coupled Device (CCD) sensor, for example, provided that an image of an object can be captured by the CCD sensor.

The terminal device 600 may further include an audio input unit 609; an audio output unit 610; an antenna 611; a communication unit 612; a wireless LAN communication unit 613; a short range radio communication antenna 614; a short range radio communication unit 615; a display 616; a touch panel 617; and a bus line 619.

The audio input unit 609 can convert sound into an audio signal. The audio output unit 610 can convert an audio signal into sound. The communication unit 612 can communicate with the closest base station device through a radio communication signal by using the antenna 611. The wireless LAN communication unit 613 can execute wireless LAN communication with an access point in accordance with the IEEE 804.11 standard. The short range radio communication unit 615 can execute short range radio communication by using the short range radio communication antenna 614.

The display 616 can be a liquid crystal display or an organic electroluminescence display, for example, that can display an image of an object or various types of icons. The touch panel 617 can be laminated on the display 616. The touch panel 617 may be formed of a pressure-sensitive panel or an electrostatic panel. The touch panel 617 can detect a position on the display 616 that is touched by a finger or a touch pen, for example. The bus line 619 can be an address bus, a data bus, or the like that is for electrically connecting the above-described components.

Additionally, the terminal device 600 may include a dedicated battery 618. The terminal device 600 can be driven by the battery 618. Note that the audio input unit 609 may include a microphone for inputting sound. The audio output unit 610 may include a speaker for outputting sound. The smartphone 11 can implement various types of processes, which are described below, by the hardware configuration of the terminal device 600 that is shown in FIG. 4, for example.

<Software Configuration>
<<Information Storage Device>>

Figure 5:
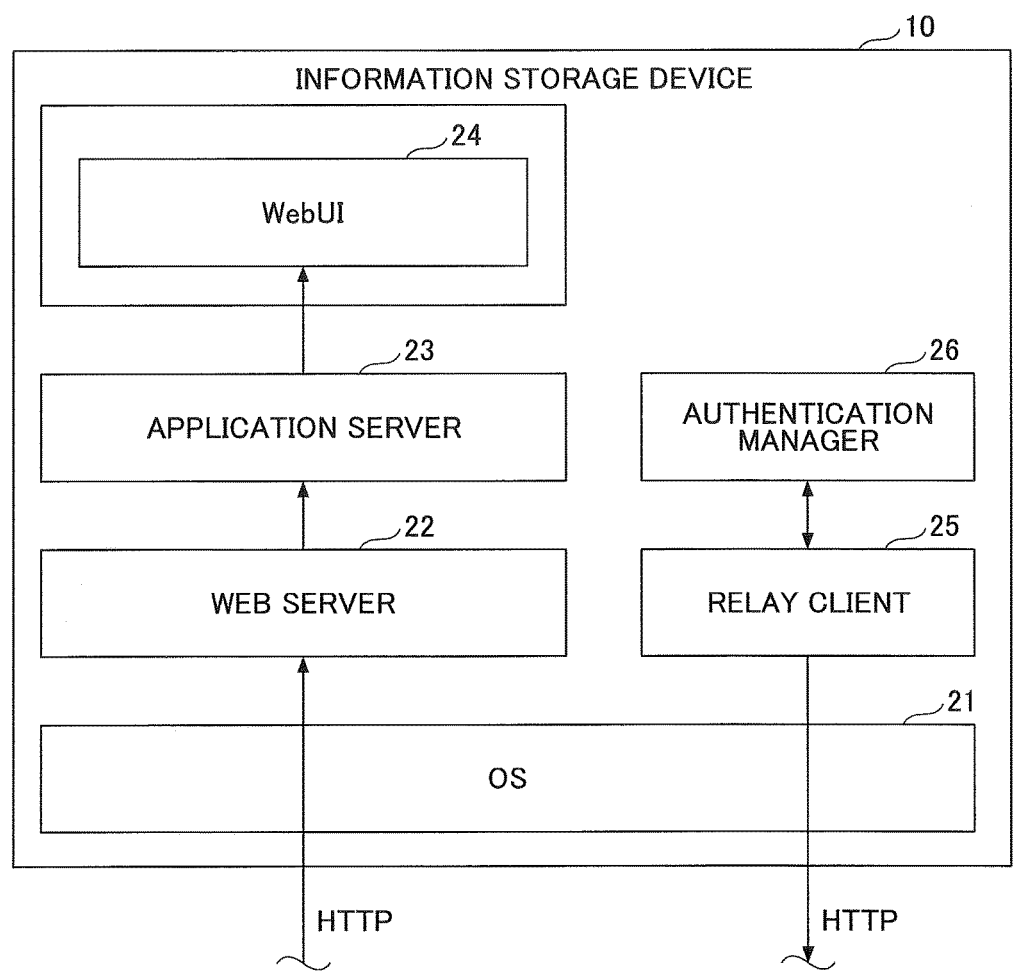
FIG. 5 is a diagram showing an example of processing blocks of an information storage device according to the embodiment.

The information storage device 10 according to the embodiment can be achieved by the processing blocks that are shown in FIG. 5, for example. FIG. 5 is a diagram showing an example of processing blocks of the information storage device 10 according to the embodiment. By executing programs, the information storage device 10 can implement functions of an OS 21; a Web server 22; an application server 23; a Web UI 24; a relay client 25; and an authentication manager 26.

The OS 21 can be an operating system of the information storage device 10, and the OS 21 can control the entire system. The OS 21 may be Windows (registered trademark) or Linux (registered trademark), for example.

The Web server 22 can be software for transmitting and receiving information in Hyper Text Transfer Protocol (HTTP). The Web server 22 can be Apache (registered trademark) or IIS (registered trademark), for example.

The application server 23 is software that can operate as a plug-in for the Web server 22, for example. The application server 23 can be Tomcat (registered trademark), for example.

The Web UI 24 can display a system setting screen in response to an HTTP request. A user can change settings through the system setting screen by using a Web browser (not shown).

The relay client 25 can access the relay server 20, and the relay client 25 can execute a process for obtaining a request from the smartphone 11. Additionally, the relay client 25 can execute a process for transmitting a request to an electronic device, such as the projector 12. The authentication manager 26 can execute an authentication process.

<<Smartphone>>

Figure 6:
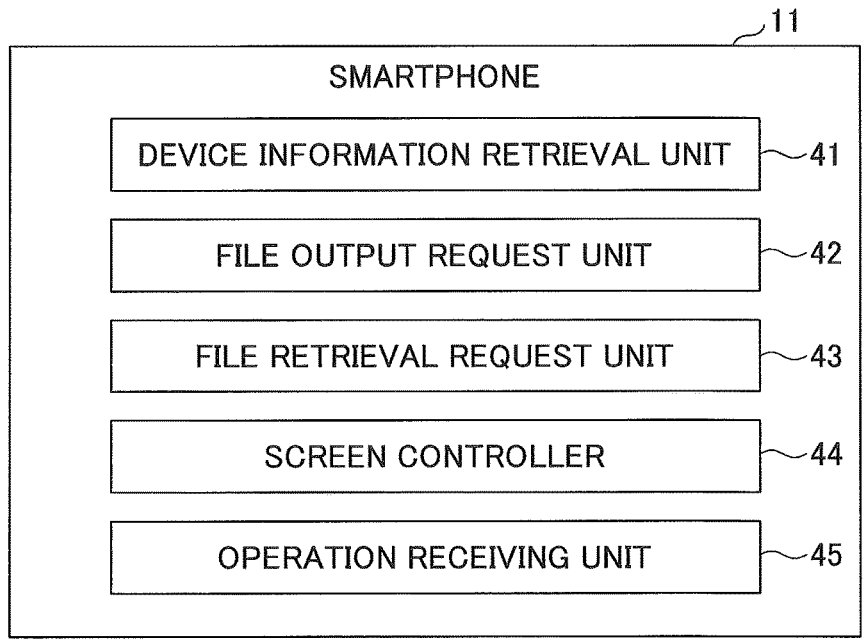
FIG. 6 is a diagram showing an example of processing blocks of a smartphone according to the embodiment.

The smartphone 11 according to the embodiment can be achieved by processing blocks that are shown in FIG. 6, for example. FIG. 6 is a diagram showing an example of the processing blocks of the smartphone 11 according to the embodiment. The smartphone 11 can implement, by executing a program, a device information retrieval unit 41; a file output request unit 42; a file retrieval request unit 43; a screen controller 44; and an operation receiving unit 45.

The device information retrieval unit 41 can retrieve device information from the short range radio devices 15-19. The file output unit 42 can transmit a file output request that is for requesting, from an electronic device, a file that is to be output from the electronic device, such as the projector 12, the IWB 13, or the MFP 14, to the information storage device 10 via the relay server 20. The file retrieval request unit 43 can transmit a file retrieval request for retrieving a file from an electronic device, such as the projector 12, the IWB 13, or the MFP 14, to the information storage device 10 via the relay server 20. The screen controller 44 can control a screen that is to be displayed on the display 616. The operation receiving unit 45 can receive an operation from a user.

<Details of the Process>

Hereinafter, there are explained details of the process by the cooperation processing system 1 according to the embodiment.

<<Device Information Retrieval>>

Figure 7:
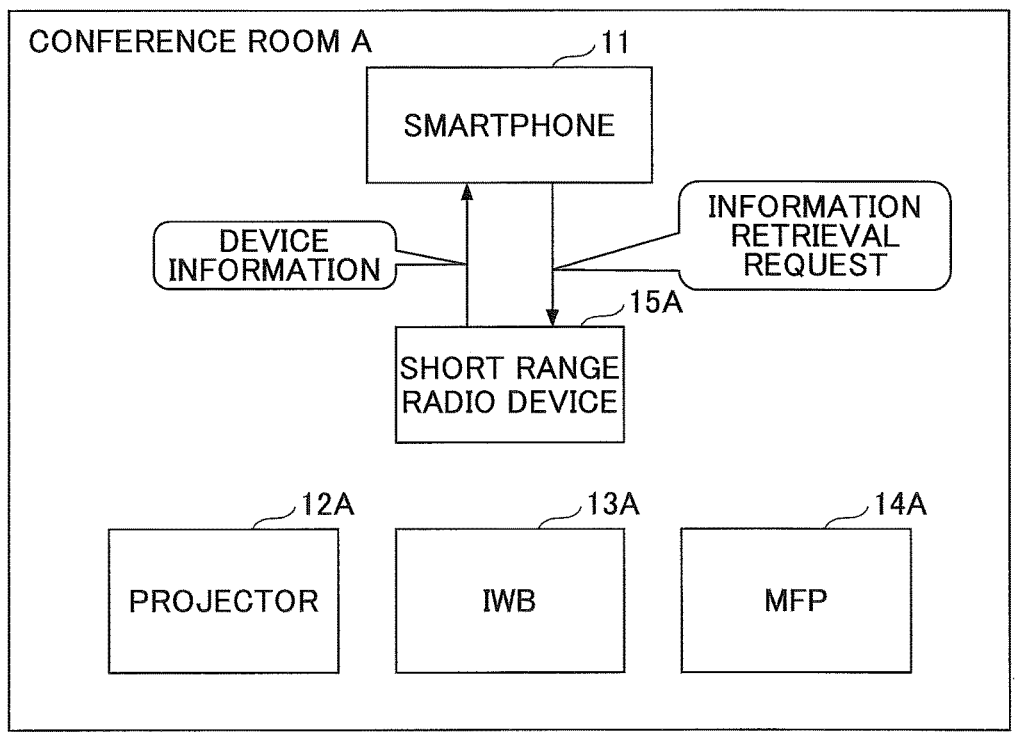
FIG. 7 is a diagram illustrating an example of a procedure for retrieving device information.

In the cooperation processing system 1 of FIG. 1, for example, as shown in FIG. 7, the smartphone 11 can retrieve device information. FIG. 7 is a diagram illustrating an example of a procedure for retrieving the device information. In the cooperation processing system of FIG. 1, the short range radio device 15A is installed in the conference room A. The short range radio device 15A may store the device information, such as shown in FIG. 8.

FIG. 8 is a diagram showing an example of the device information that is stored in the short range radio device 15A. The device information of FIG. 8 may include information that is for identifying the projector 12A, the IWB 13A, and the MFP 14A that are installed in the conference room A; information that is for establishing connections to the projector 12A, the IWB 13A, and the MFP 14A; and information that is for identifying the conference room. Additionally, the device information of FIG. 8 may include information that is for identifying the information storage device 10; and information that is for establishing a connection to the information storage device 10.

Note that, in FIG. 8, an IP address, a host name, and a MAC address are shown as an example of information for establishing a connection to each of the information storage device 10, the projector 12A, the IWB 13A, and the MFP 14A. The smartphone 11 can retrieve device information of the information storage device 10 and all the electronic devices that are installed in the conference room A, as shown in FIG. 8, by transmitting a request for device information to the short range radio device 15A.

Figure 9:
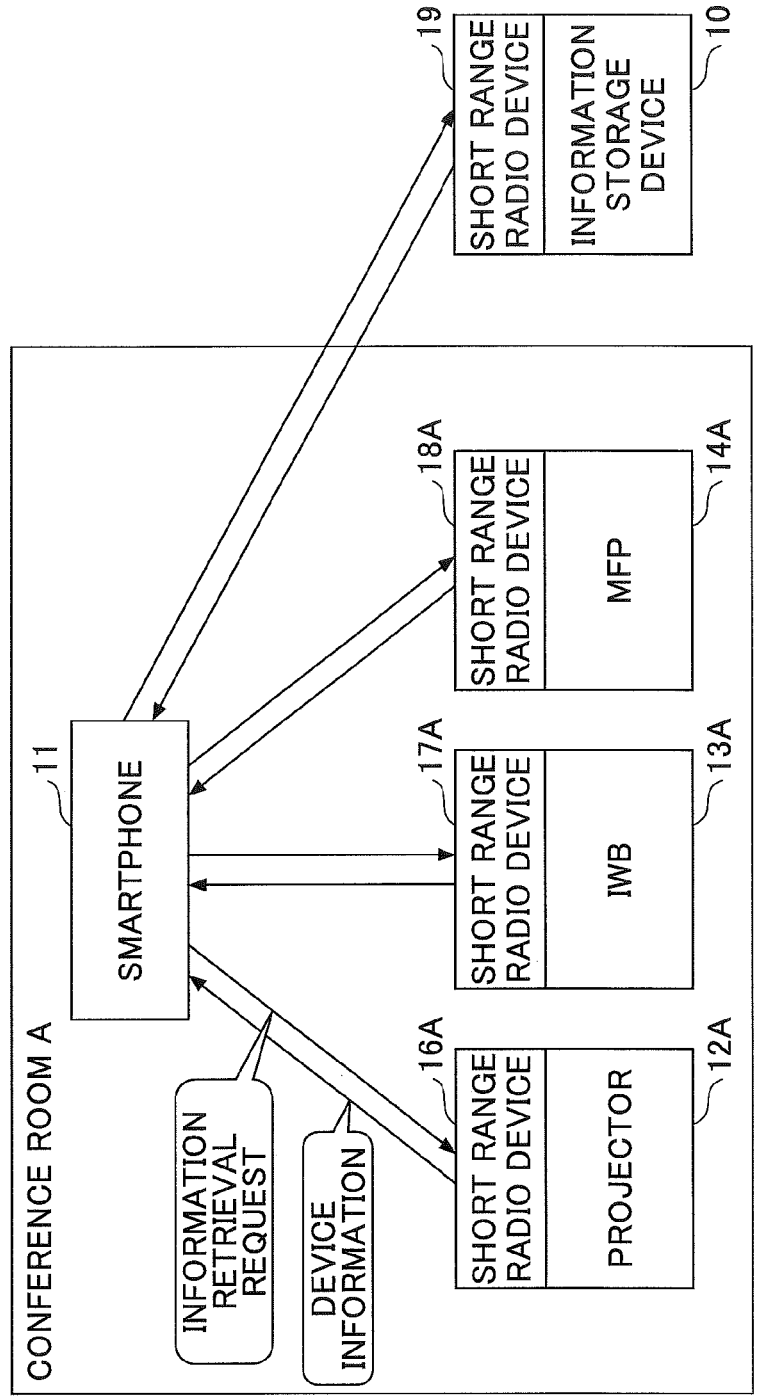
FIG. 9 is a diagram illustrating another example of the procedure for retrieving the device information.

In the cooperation processing system 1a of FIG. 2, the smartphone 11 can retrieve device information as shown in FIG. 9, for example. FIG. 9 is a diagram illustrating another example of the procedure for retrieving the device information. In the cooperation processing system 1a of FIG. 2, the short range radio devices 16A-18A are provided in the projector 12A, the IWB 13A, and the MFP 14A, respectively, that are installed in the conference room A. Further, the short range radio device 19 is provided in the information storage device 10.

The short range radio devices 16A-18A store device information of the projector 12A, device information of the IWB 13A, and device information of the MFP 14A, respectively (the short range radio devices 16A-18A are provided in the projector 12A, the IWB 13A, and the MFP 14A, respectively). Further, the short range radio device 19 stores device information of the information storage device 10. For example, the short range radio device 16A may store the device information, such as shown in FIG. 10.

FIG. 10 is a diagram showing an example of the device information that is stored in the short range radio device 16A. The device information of FIG. 10 shows an example of the device information of the projector 12A that is installed in the conference room A. The device information of the projector 12A of FIG. 10 may include information that is for identifying the projector 12A, information that is for establishing a connection to the projector 12A, and information that is for identifying the conference room. In FIG. 10, as an example of the information for establishing a connection to the projector 12A, an IP address, a host name, and a MAC address are shown. As shown in FIG. 10, the smartphone 11 can retrieve the device information of the projector 12A in which the short range radio device 16A is provided by transmitting a request for the device information to the short range radio device 16A.

Similarly, by requesting the device information from the short range radio devices 17A, 18A, and 19, the smartphone 11 can retrieve the device information of the IWB 13A, the device information of the MFP 14A, and the device information of the information storage device 10, respectively. Here, depiction of the device information of the IWB 13A, the MFP 14A, and the information storage device 10 is omitted.

In this manner, in the cooperation processing systems 1 and 1a according to the embodiment, device information can be obtained from the short range radio devices 15-19. By such a configuration, the smartphone 11 that is located in a limited space, such as inside a conference room, can be allowed to control an electronic device that is located in the limited space.

Additionally, by the configurations of the cooperation processing systems 1 and 1a according to the embodiment in which the device information can be obtained from the short range radio devices 15-19, a process, by a user, of inputting device information to the smartphone 11 can be omitted.

<<File Output Process>>

Hereinafter, an example of a file output process in the cooperation processing system 1 is explained. However, a file output process in the cooperation processing system 1a is substantially the same, except for the procedure for retrieving the device information.

Figure 11:
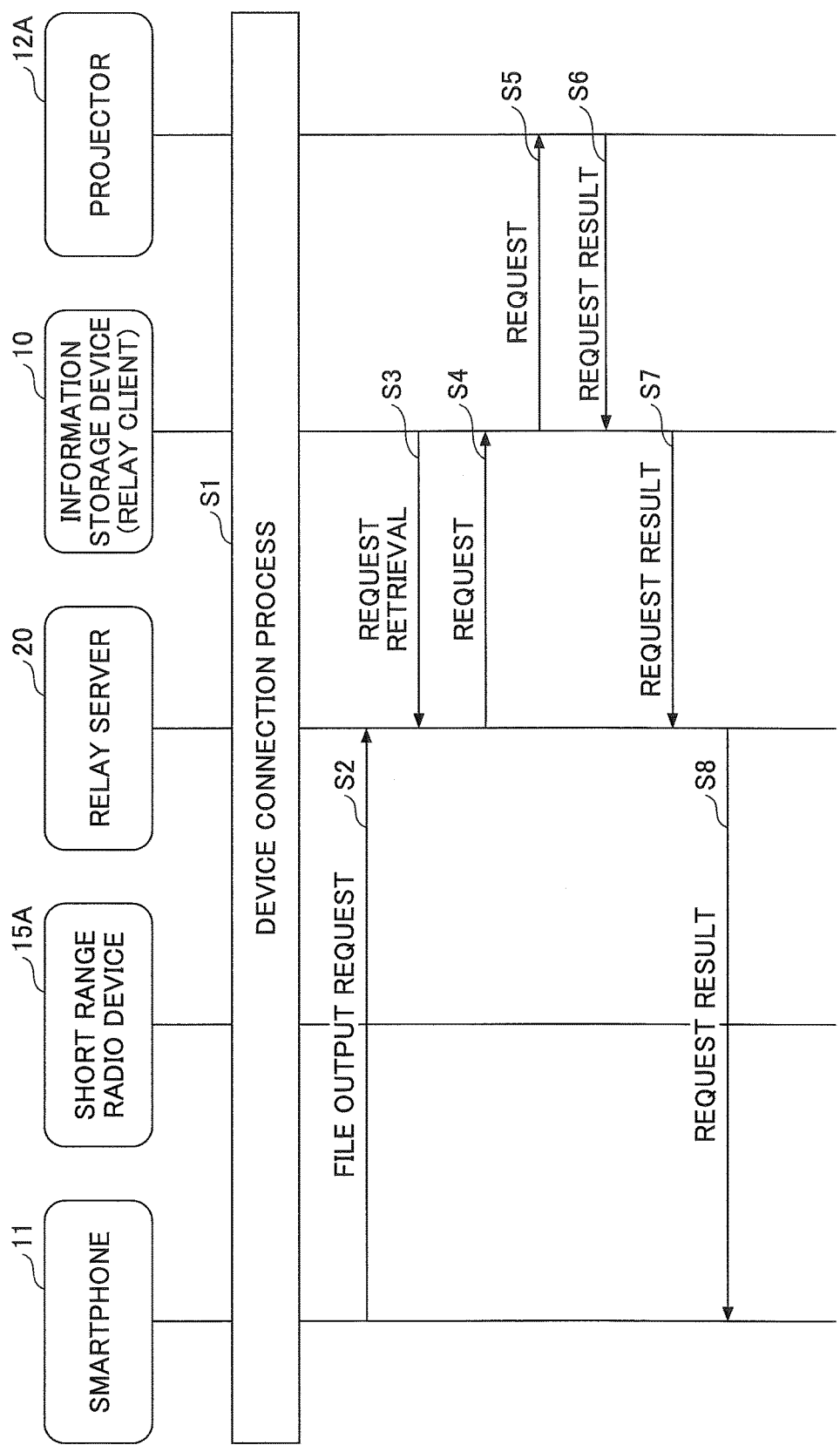
FIG. 11 is a sequence diagram of an example of a file output process in the cooperation processing system according to the embodiment.

FIG. 11 is a sequence diagram of an example of a file output process in the cooperation processing system 1 according to the embodiment. The sequence diagram of FIG. 11 represents a process of causing the projector 12A to output a file by the smartphone 11 that is connected to the network N1, such as a telephone line.

At step S1, the device information retrieval unit 41 of the smartphone 11 retrieves device information, such as that shown in FIG. 8, from the short range radio device 15A. Then, the smartphone 11 executes a device connection process, which is described below.

Figures 12, 13:
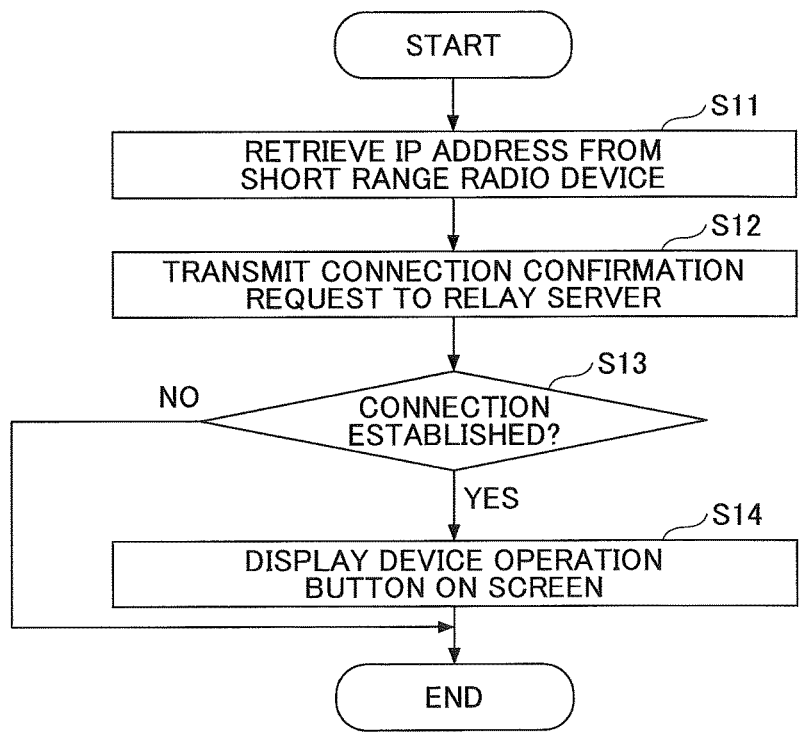
FIG. 12 is a diagram showing an example of a file output request.
FIG. 13 is a flowchart showing an example of a device connection process.

At step S2, the file output request unit 42 of the smartphone 11 transmits a file output request that is for requesting, from the projector 12A, a file that is to be output from the projector 12A to the relay server 20. FIG. 12 shows an example of the information that is included in the file output request that is transmitted at step S2.

FIG. 12 is an example of information that is included in a file output request. The file output request of FIG. 12 may include information storage device ID, device connection information, and a request command. The information storage device ID is identification (ID) for identifying the information storage device 10. The information storage device ID can be used by the relay server 20 for managing a request.

The device connection information may include an IP address and a host name that are for establishing a network connection to an electronic device, such as the projector 12A, and the device connection information can be obtained from the short range radio device 15A. The request command is a command for executing an interface (IF) function that is provided by an electronic device, such as the projector 12A. The request command can be, for example, an HTTP request that is for executing an IF function of WebApi.

For a case in which the file output request is for causing an electronic device, such as the projector 12A, to output a file, the request command may include a file. At step S3, the information storage device 10 transmits a request for retrieving a request to the relay server 20. At step S4, the information storage device 10 obtains the file output request of FIG. 12 from the relay server 20.

At step S5, the relay client 25 of the information storage device 10 executes the file output request with respect to the projector 12A that is specified by the device connection information of the file output request.

Here, the relay client 25 of the information storage device 10 executes the request command of the file output request that is obtained from the relay server 20 as it is, and the relay client 25 executes a process that does not depend on the content of the request command.

By executing such a process, in the cooperation processing system 1 according to the embodiment, even if a new electric device is to be used or an IF of an electric device is to be changed, the smartphone 11 can handle such a change, and the relay server 20 and the information storage device 10 may not need to handle the change.

At step S6, the relay client 25 of the information storage device 10 obtains a result of the file output request from the projector 12A. At step S7, the relay client 25 of the information storage device 10 returns the result of the file output request that is obtained from the projector 12A to the relay server 20, as a response to step S4. At step S8, the relay server 20 returns the result of the file output request that is obtained from the information storage device 10 to the smartphone 11, as a response to step S2.

The device connection process of step S1 can be executed as follows, for example. A user who is carrying the smartphone 11 enters the conference room A, and the user activates an application for a file output process. The application for the file output process that is activated in the smartphone 11 can execute the device connection process as shown in FIG. 13, for example.

FIG. 13 is a flowchart of an example of the device connection process. At step S11, the device information retrieval unit 41 of the smartphone 11 retrieves device information of the information storage device 10 and all the electronic devices that are installed in the conference room A by requesting the device information from the short range radio device 15A.

At step S12, the screen controller 44 of the smartphone 11 transmits a connection confirmation request to the relay server 20 by using the retrieved device information of the electric devices. When the establishment of the connections to the electronic devices can be confirmed, at step S14, the screen controller 44 causes buttons 1001 that are for making file output requests to the electronic devices to be displayed on a file display screen in a state in which the buttons 1001 can be selected, as shown in FIG. 14.

Figure 15:
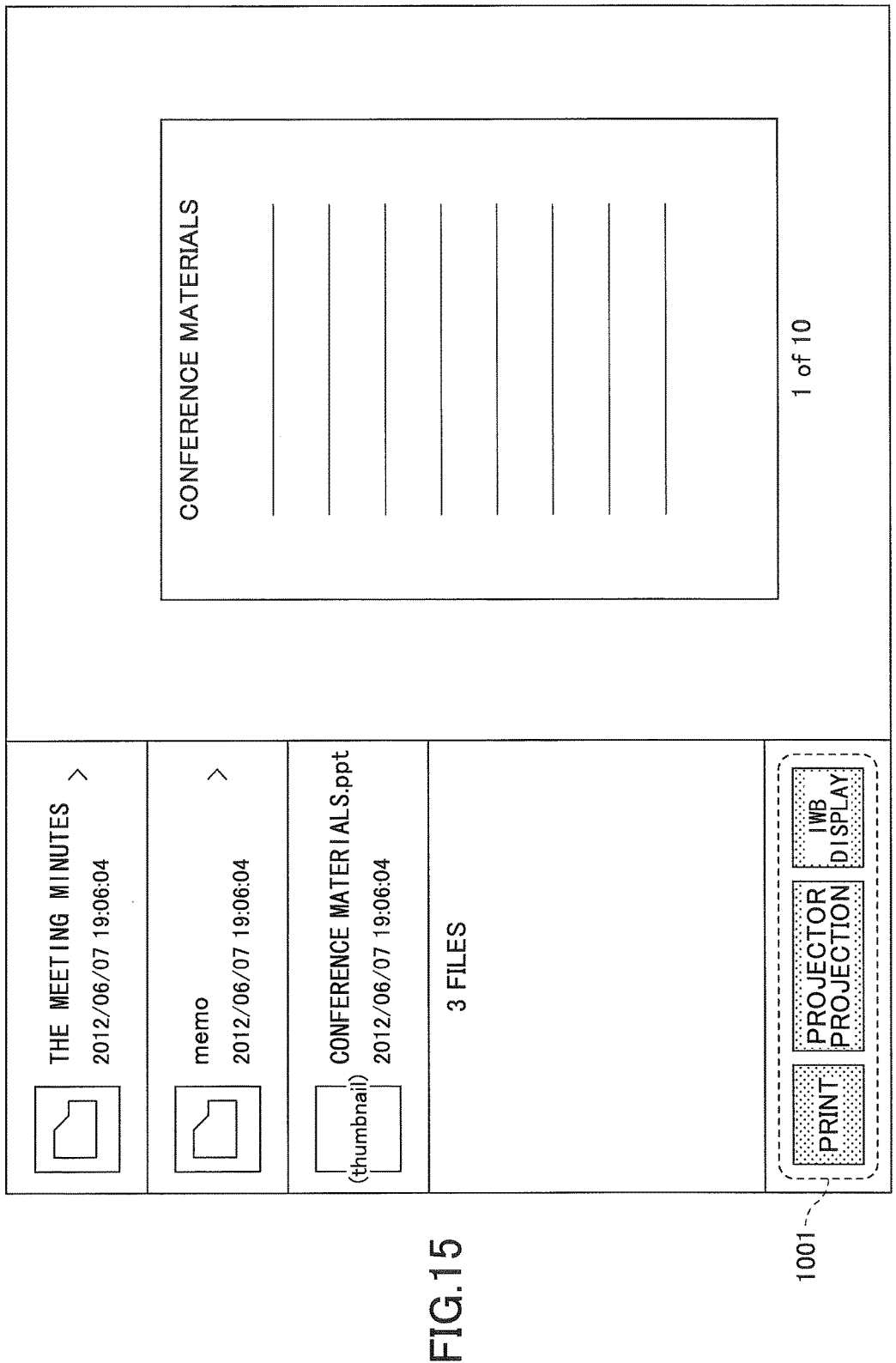
FIG. 15 is an image diagram showing an example of the file display screen in a state in which a button for making the file output request to the electronic device may not be selected.

When the establishment of the connections to the electronic devices may not be confirmed, the screen controller 44 causes the buttons 1001 that are for making the file output requests to the electronic devices to be displayed on the file display screen in a state in which the buttons 1001 may not be selected, as shown in FIG. 15.

Figure 14:
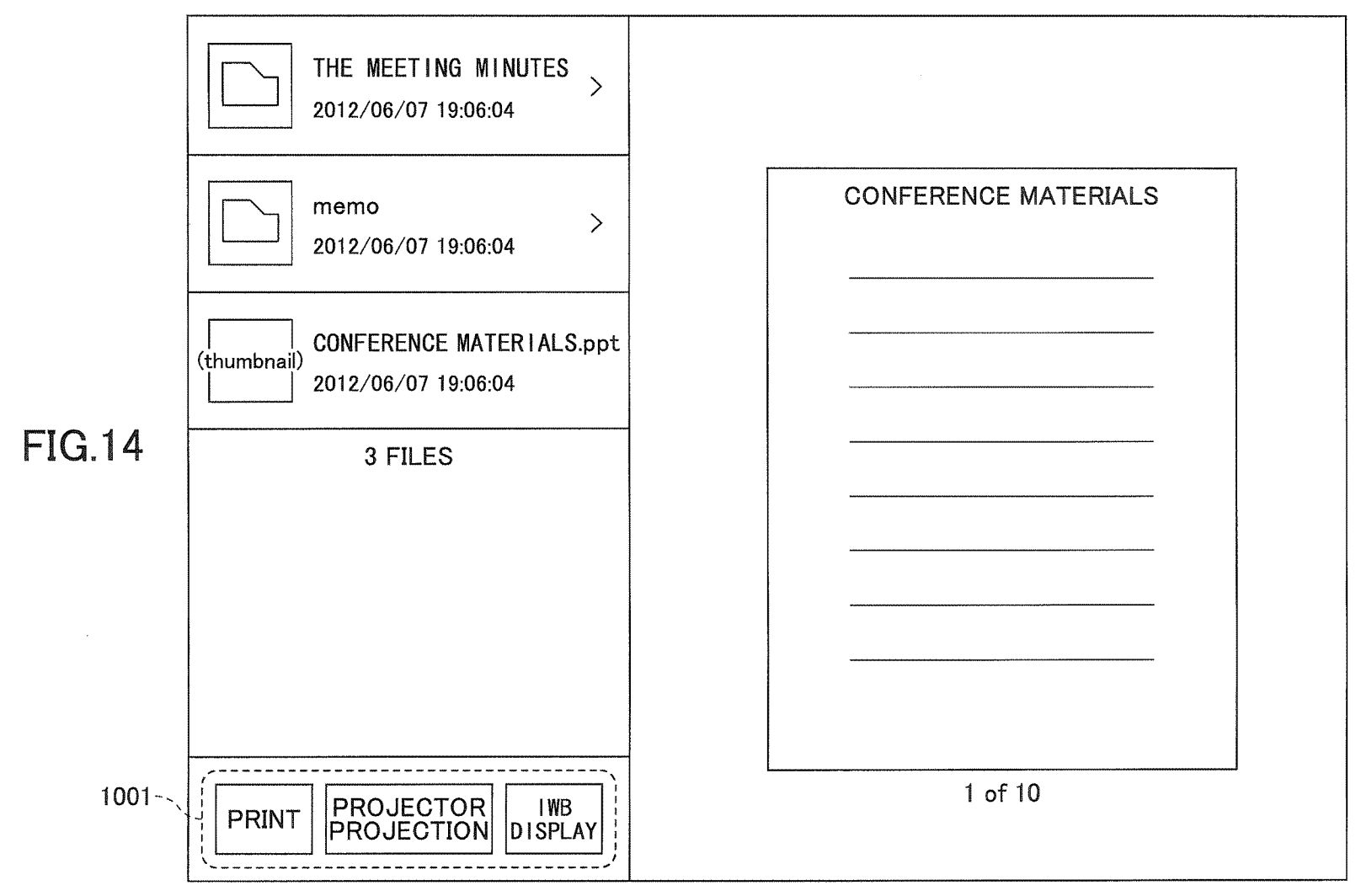

FIG. 14 is an image diagram showing an example of the file display screen in a state in which buttons for making the file output requests to the electronic devices can be selected. FIG. 15 is an image diagram showing an example of the file display screen in a state in which the buttons for making the file output requests to the electronic devices may not be selected.

For example, the screen controller 44 of the smartphone 11 can cause the file display screen, such as shown in FIG. 15, to be displayed until the establishment of the connections to the electronic devices is confirmed by the connection confirmation request at step S12. When the establishment of the connections to the electronic devices can be confirmed, the screen controller 44 causes the file display screen of FIG. 14 to be displayed such that the state in which the buttons 1001 for making the file output requests to the electronic devices may not be selected is updated to a state in which the buttons 1001 can be selected.

A user can make a file output request by pressing a "projector projection button" that is included in the buttons 1001 of the file display screen of FIG. 14 that are for making the file output requests to the electronic devices. Upon the "projector projection button" being pressed, the file output request unit 42 of the smartphone 11 causes the projector 12A to output the file that is displayed at the right side of the file display screen of FIG. 14, for example.

In this manner, in the cooperation processing system 1 according to the embodiment, even if a user enters the conference room A while carrying the smartphone 11 that may not be connected to the network N3 to which the electronic device, such as the projector 12A, is connected, the user can control the electronic device by using the smartphone 11.

The smartphone 11 can cause the projector 12A to display a file that is displayed on the file display screen, or the smart phone 11 can retrieve a file that is displayed on the file display screen, for example.

<<File Retrieval Process>>

Hereinafter, a file retrieval process in the cooperation processing system 1 is explained as an example. However, a file retrieval process in the cooperation processing system 1a is substantially the same, except for the procedure for retrieving the device information.

Figure 16:
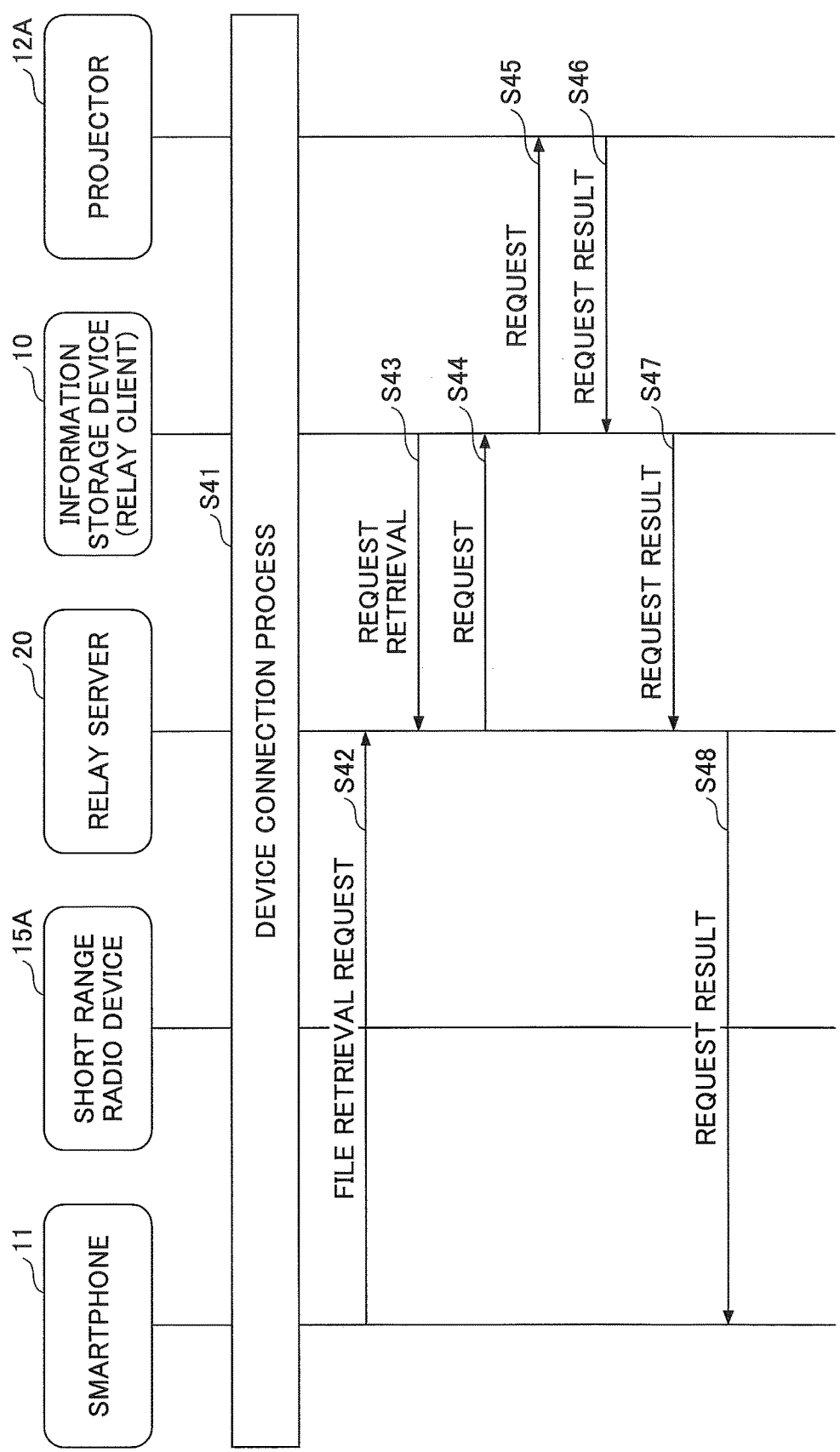
FIG. 16 is a sequence diagram showing an example of a file retrieval process in the cooperation processing system according to the embodiment.

FIG. 16 is a sequence diagram showing an example of the file retrieval process in the cooperation processing system 1 according to the embodiment. The sequence diagram of FIG. 16 shows a process, by the smartphone 11 that is connected to the network N1, such as a telephone line, for retrieving a file from the projector 12A.

At step S41, the device information retrieval unit 41 of the smartphone 11 retrieves the device information, such as shown in FIG. 8, from the short distance radio device 15A. Then, the smartphone 11 executes a device connection process, such as shown in FIG. 13.

In the device connection process at step S41, for example, a user who is carrying the smartphone 11 enters the conference room A, and the user activates an application for the file retrieval process. The device information retrieval unit 41 of the smartphone 11 retrieves device information of the information storage device 10 and all the electronic devices that are installed in the conference room A by requesting the device information from the short range radio device 15A. The screen controller 44 of the smartphone 11 transmits a connection confirmation request to the relay server 20 by using the retrieved device information of the electronic devices, and the screen controller 44 confirms establishment of connections to the electronic devices.

Figure 17:
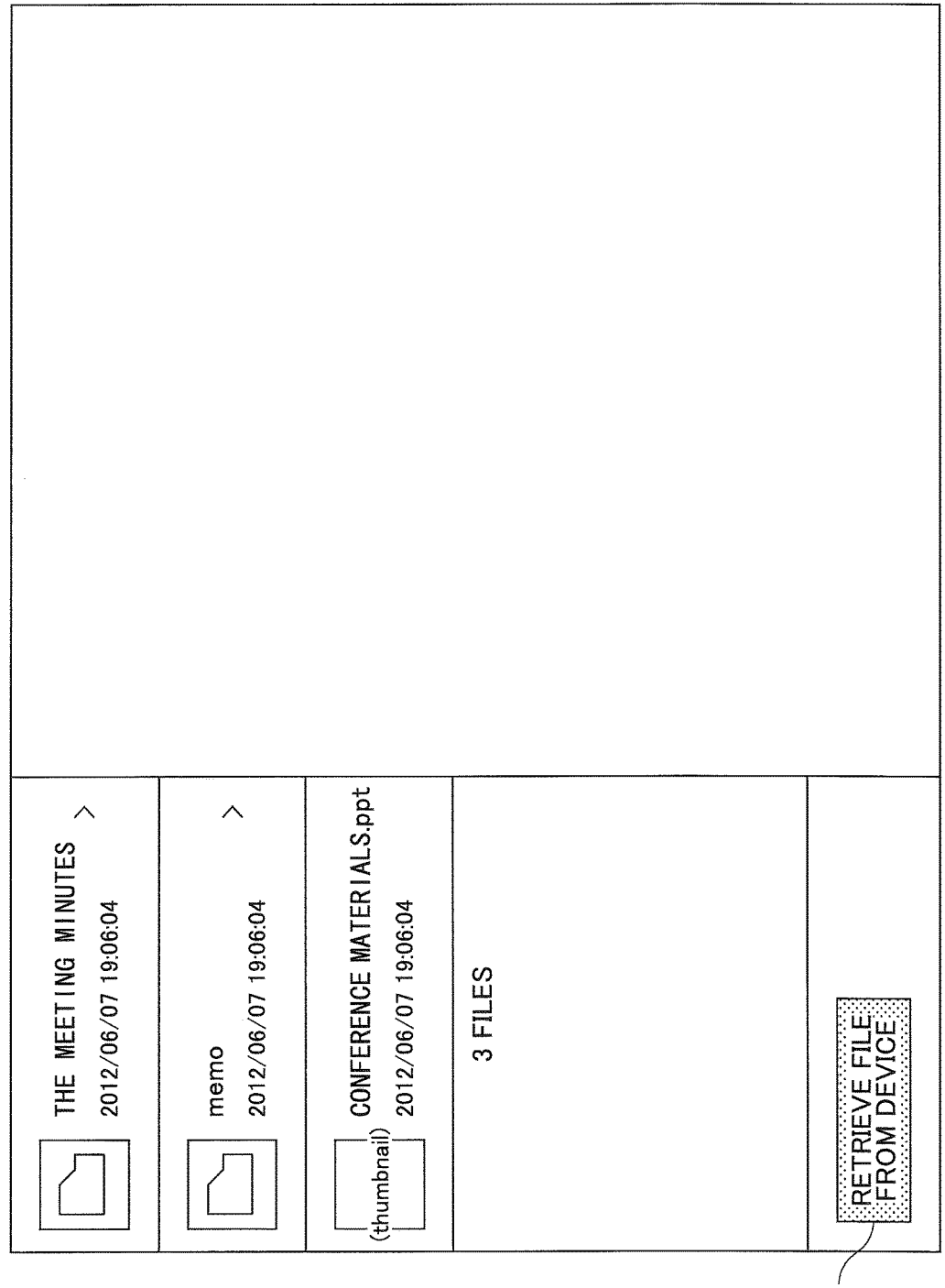
FIG. 17 is an image diagram showing an example of a file retrieval screen in which a button that is for transitioning to an electronic device selection screen may not be selected.

When the establishment of the connections to the electronic devices may not be confirmed, the screen controller 44 causes a button 1011 to be displayed on a file retrieval screen in a state in which the button 1011 may not be selected, such as shown in FIG. 17. Here, the button 1011 is for transitioning to an electronic device selection screen for selecting an electronic device to which a file retrieval request is to be made.

Figure 18:
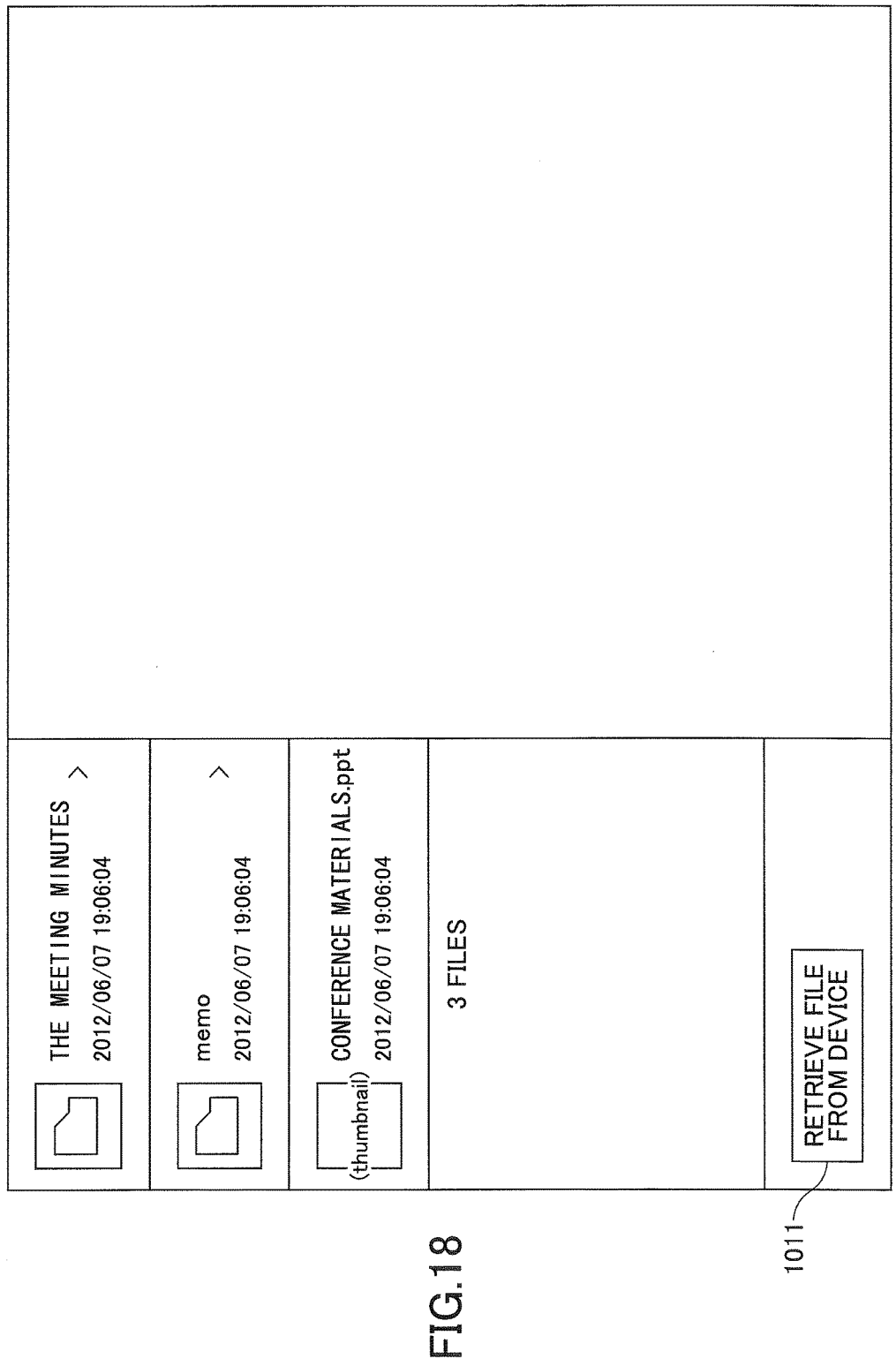
FIG. 18 is an image diagram showing an example of a file retrieval screen in which the button that is for transitioning to the electronic device selection screen can be selected.

When the establishment of the connections to the electronic devices can be confirmed, the screen controller 44 causes the file retrieval screen in a state such as shown in FIG. 18 to be displayed. Here, the file retrieval screen is in the state in which the button 1011 for transitioning to the electronic device selection screen can be selected.

FIG. 17 is an image diagram showing an example of the file retrieval screen in a state in which the button 1011 for transitioning to the electronic device selection screen may not be selected. FIG. 18 is an image diagram showing an example of the file retrieval screen in a state in which the button 1011 for transitioning to the electronic device selection screen can be selected.

For example, the screen controller 44 of the smartphone 11 causes the file retrieval screen, such as shown in FIG. 17, to be displayed until the establishment of the connections to the electronic devices can be confirmed by the connection confirmation request at step S12. Then, after the establishment of the connections to the electronic devices can be confirmed, the screen controller 44 causes the file retrieval screen, such as shown in FIG. 18, to be displayed such that the state in which the button 1011 for transitioning to the electronic device selection screen may not be selected is updated to the state in which the button 1011 can be selected.

Figure 19:
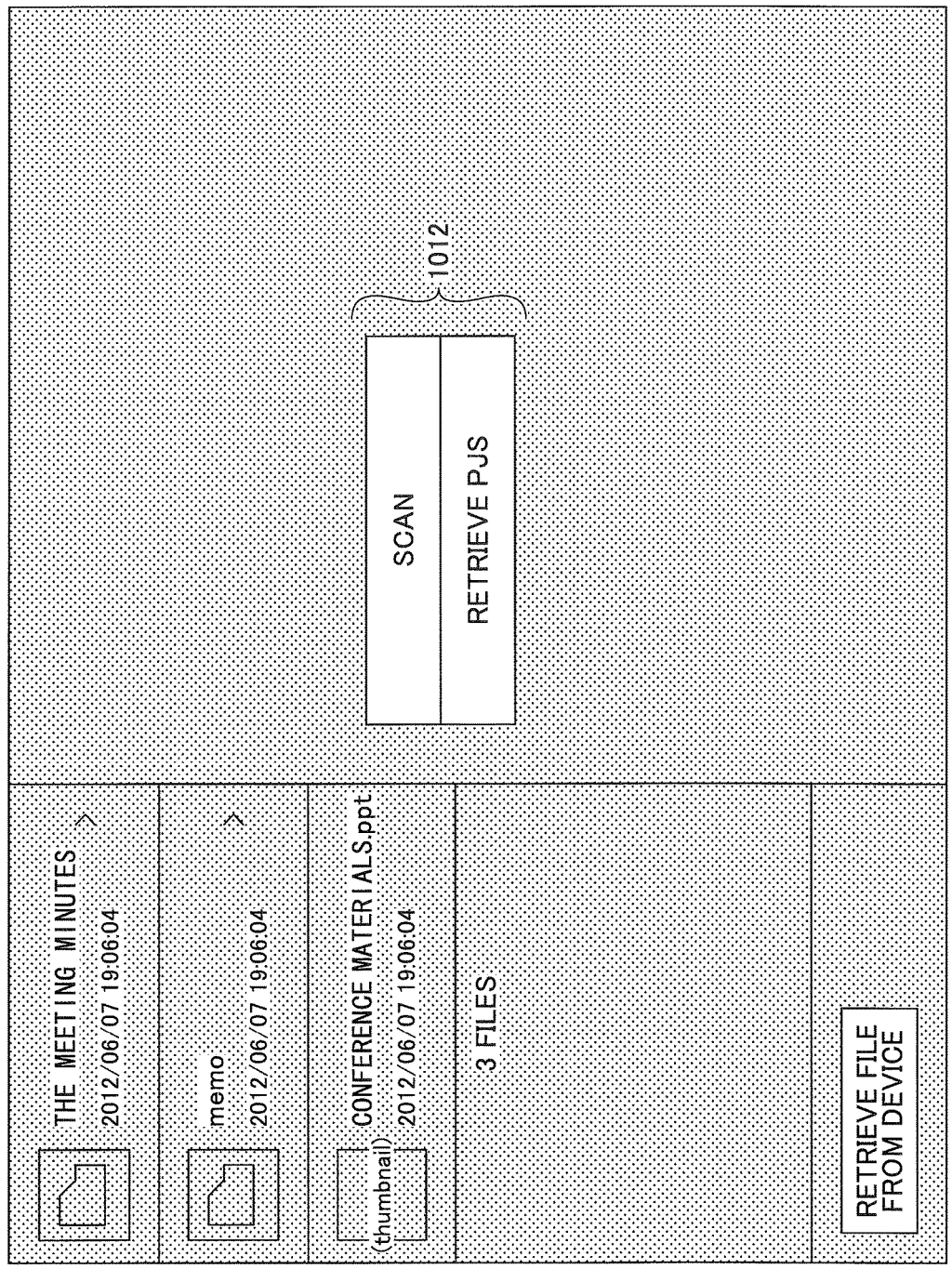
FIG. 19 is an image diagram of an example of the electronic device selection screen.

A user can cause the electronic device selection screen, such as shown in FIG. 19, to be displayed by pressing the button 1011 of the file retrieval screen of FIG. 18 that is for transitioning to the electronic device selection screen. FIG. 19 is an image diagram showing an example of the electronic device selection screen. In the electronic device selection screen of FIG. 19, there is displayed a list 1012 of retrieval types of the electronic device for which the establishment of the connection is confirmed.

The screen controller 44 refers to a table, such as shown in FIG. 20, and the screen controller 44 displays, as the list 1012, retrieval types that are associated with device types of the electronic devices for which the establishment of the connections are confirmed. FIG. 20 is a diagram showing an example of a table that defines correspondence among a device type, an output type, and a retrieval type of the electronic device.

The device type is the same as the device type that is included in the device information. The device type represents a type of an electronic device, such as the projector 12. The output type represents a mode of output by an electronic device, such as projection by a projector, IWB display, or printing. The retrieval type represents a mode of retrieval by an electronic device, such as PJS retrieval, IWB retrieval, or scanning.

By referring to a table such as shown in FIG. 20, the screen controller 44 can cause the buttons 1001 that are for making file output requests to the electronic devices of the file display screen that is shown in FIG. 14 and in FIG. 15 to include a button for selecting an output type of the electronic device for which the establishment of the connection is confirmed.

Further, by referring to a table such as shown in FIG. 20, the screen controller 44 can cause the list 1012 of the electronic device selection screen that is shown in FIG. 19, for example, to include a button for selecting a retrieval type of the electronic device for which the establishment of the connection is confirmed.

By pressing a "PJT retrieval button" that is included in the list 1012, a user can make a file retrieval request. Upon the "PJT retrieval button" that is included in the list 1012 being pressed, the file retrieval request unit 43 of the smartphone 11 retrieves a file from the projector 12A, for example.

At step S42, the file retrieval request unit 43 of the smartphone 11 transmits a file retrieval request that is addressed to the projector 12A to the relay server 20. The file retrieval request that is to be transmitted at step S42 may include the information that is shown in FIG. 12, for example.

At step S43, the information storage device 10 transmits a request that is for retrieving a request to the relay server 20. At step S44, the information storage device 10 obtains the file retrieval request, such as shown in FIG. 12, from the relay server 20.

At step S45, the relay client 25 of the information storage device 10 executes the file retrieval request with respect to the projector 12A that is specified by the device connection information of the file retrieval request.

Here, the relay client 25 of the information storage device 10 executes the request command of the file retrieval request that is obtained from the relay server 20 as it is, and the relay client 25 executes a process that does not depend on the content of the request command.

At step S46, the relay client 25 of the information storage device 10 obtains a result of the file retrieval request from the projector 12A. At step S47, the relay client 25 of the information storage device 10 returns the result of the file retrieval request that is obtained from the projector 12A to the relay server 20, as a response to step S44. At step S48, the relay server 20 returns the result of the file retrieval request that is obtained from the information storage device 10 to the smartphone 11, as a response to step S42.

Figure 21:
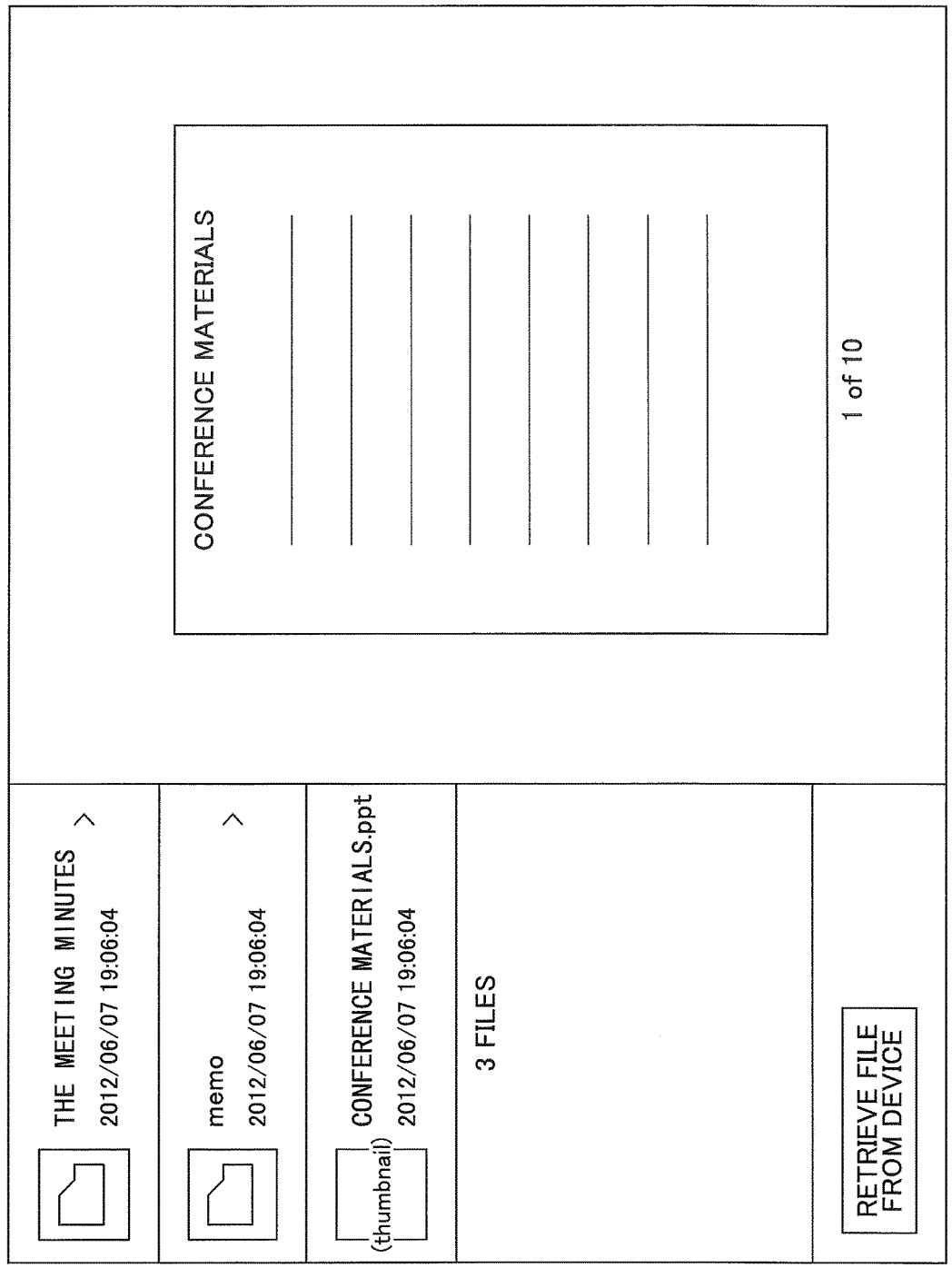
FIG. 21 is an image diagram showing an example of the file retrieval screen in which a retrieved file is displayed.

After obtaining the result of the file retrieval request from the relay server 20, the screen controller 44 of the smartphone 11 displays the obtained file on the file retrieval screen, as shown in FIG. 21, for example. FIG. 21 is an image diagram showing an example of the file retrieval screen on which the obtained file is displayed.

In this manner, in the cooperation processing system 1 according to the embodiment, even if a user enters the conference room A while carrying the smartphone 11 which may not be connected to the network N3 to which the electronic device, such as the projector 12A, is connected, the user can control the electronic device by using the smartphone 11.

Consequently, the smartphone 11 can retrieve a file that is output (projected) by the projector 12, the smartphone 11 can retrieve a file that is output (displayed) by the IWB 13A, and the smartphone 11 can retrieve a file that is output (scanned) by the MFP 14A.

<<File Output and Retrieval Process>>

Hereinafter, an example is explained such that, in the cooperation processing system 1, a file output process is executed, and subsequently a file retrieval process is executed. However, the file output and retrieval process in the cooperation processing system 1a is substantially the same, except for the procedure for retrieving the device information.

FIG. 22 is a sequence diagram showing an example of the file output process and the file retrieval process in the cooperation processing system 1 according to the embodiment. The sequence diagram of FIG. 22 includes some portions that overlap with those of the sequence diagrams of FIGS. 11 and 16. Thus, the explanation is appropriately partially omitted.

FIG. 22 shows an example of a process such that a smartphone 11A that is connected to the network N1 causes the projector 12A to output a file, and after that a smartphone 11B that is connected to the network N1 retrieves the file from the projector 12A.

At step S61, the device information retrieval unit 41 of the smartphone 11A retrieves device information, such as shown in FIG. 8, from the short range radio device 15A. Then, the smartphone 11A executes the above-described device connection process. The file display screen that is shown in FIG. 14 is displayed in the smartphone 11A.

By pressing the "projector projection button" that is included in the buttons 1001 for making file output requests to the electronic devices of the file display screen of FIG. 14, a user can select the projector 12A as an electronic device which is to be requested to output a file.

At step S62, the file output request unit 42 of the smartphone 11A transmits a file output request that is addressed to the projector 12A to the relay server 20. The file output request that is to be transmitted at step S62 includes, in addition to the information such as shown in FIG. 12, a file and output setting, for example.

At step S63, the information storage device 10 transmits a request that is for retrieving a request to the relay server 20. At step S64, the information storage device 10 obtains the file output request from the relay server 20. Note that, for a case of using a relay server 20 that receives, from multiple information storage devices 10, multiple requests that are for retrieving corresponding requests, each of the information storage devices 10 can receive the file output request that is addressed to the information storage device 10 itself by including the own information storage device ID in the request that is for retrieving the corresponding request.

At step S65, the relay client 25 of the information storage device 10 executes the file output request with respect to the projector 12A that is specified by the device connection information of the file output request. In response to the process of step S65, the projector 12A starts outputting (projecting) the file that is included in the file output request.

At step S66, the relay client 25 of the information storage device 10 obtains a result of the file output request from the projector 12A. At step S67, the relay client 25 of the information storage device 10 returns the result of the file output request that is obtained from the projector 12A to the relay server 20, as a response to step S64. At step S68, the relay server 20 returns the result of the file output request that is obtained from the information storage device 10 to the smartphone 11, as a response to step S62.

Hereinafter, an example is explained such that, after the projector 12A starts outputting (projecting) the file, a user who is carrying the smartphone 11B obtains the file that is output by the projector 12A by using the smartphone 11B.

At step S69, the device information retrieval unit 41 of the smartphone 11B retrieves the device information, such as shown in FIG. 8, from the short range radio device 15A. Then, the smartphone 11B executes the above-described device connection process. The electronic device selection screen that is shown in FIG. 19 is displayed in the smartphone 11B.

By pressing, for example, the "PJS retrieval button" that is included in the list 1012 of the electronic device selection screen of FIG. 19, the user can select the projector 12A as an electronic device that is to receive a file retrieval request.

At step S70, the file retrieval request unit 43 of the smartphone 11B transmits a file retrieval request that is addressed to the projector 12A to the relay server 20. The file retrieval request that is to be transmitted at step S70 includes, in addition to the information such as shown in FIG. 12, retrieval setting, for example.

At step S71, the information storage device 10 transmits a request that is for retrieving a request to the relay server 20. At step S72, the information storage device 10 obtains the file retrieval request from the relay server 20.

At step S73, the relay client 25 of the information storage device 10 executes the file retrieval request with respect to the projector 12A that is specified by the device connection information of the file retrieval request.

At step S74, the relay client 25 of the information storage device 10 obtains a result of the file retrieval request from the projector 12A. By the process of step S74, when the file retrieval is successful, the file is returned to the relay client 25 of the information storage device 10 from the projector 12A; and when the file retrieval has failed, an error signal is returned to the relay client 25 of the information storage device 10 from the projector 12A.

At step S75, the relay client 25 of the information storage device 10 returns the result of the file retrieval request that is obtained from the projector 12A to the relay server 20, as a response to step S72. At step S76, the relay server 20 returns the result of the file retrieval request that is obtained from the information storage device 10 to the smartphone 11, as a response to step S70.

After obtaining the result of the file retrieval request from the relay server 20, the screen controller 44 of the smartphone 11B displays the obtained file on the file retrieval screen as shown in FIG. 21. Here, for a case in which the process of the projector 12A is a time-consuming process, step S76 can be returned as a response to a retrieval request, from the smartphone 11B, that is for retrieving a result of the file retrieval request, instead of the response to step S70.

In this manner, in the cooperation processing system 1 according to the embodiment, an electronic device, such as the projector 12A, can be controlled by a plurality of smartphones, e.g., the smartphones 11A and 11B, that may not be connected to the network N3 to which the electronic device is connected.

In the cooperation processing system 1 according to the embodiment, the smartphone 11A can cause the projector 12A to output (project) a file; the smartphone 11A can cause the IWB 13A to output (display) a file; and the smartphone 11A can cause the MFP 14A to output (print) a file, for example.

Additionally, in the cooperation processing system 1 according to the embodiment, the smartphone 11B that is different from the smartphone 11A can obtain the file that is output by the projector 12A; and the smartphone 11B can obtain the file that is output by the IWB 13A. Furthermore, the smartphone 11B can obtain the file that is scanned by the MFP 14A.

<<Access Restriction with Respect to the Electronic Device>>

In the cooperation processing system 1 according to the embodiment, the smartphone 11 can be restricted from accessing an electronic device, such as the projector 12A, in the following manner.

For example, for a case of accessing an electronic device, such as the projector 12A, that is connected to the network N3 from the smartphone 11 of FIG. 1, a password-based authentication process can be executed. Here, the example of the access restriction is explained by using the sequence diagram of FIG. 11.

At step S2 of FIG. 11, the file output request unit 42 of the smartphone 11 transmits a file output request, such as shown in FIG. 23, to the relay server 20. FIG. 23 is a diagram showing another example of information that is included in the file output request. The information of FIG. 23 that is included in the file output request includes password information, in addition to the information of FIG. 12 that is included in the file output request. The password information that is included in the file output information represents a password that is required for accessing the information storage device 10.

At step S4, the relay client 25 of the information storage device 10 receives the file output request of FIG. 23 from the relay server 20. The relay client 25 requests an authentication manager 26 to execute an authentication process with respect to the password information that is included in the file output request. The authentication manager 26 determines whether the password information is correct or not. Here, the password can be set, for example, by an administrator in advance through the Web UI 24. The authentication manager 26 returns information indicating successful authentication to the relay client 25 if the password information is correct, and the authentication manager 26 returns information indicating authentication failure to the relay client 25 if the password information is incorrect.

When the information indicating the successful authentication is returned, the relay client 25 executes the file output request with respect to the projector 12A that is specified by the device connection information of the file output request. When the information indicating the authentication failure is returned, the relay client 25 does not execute the file output request with respect to the projector 12A that is specified by the device connection information of the file output request. In this case, the relay client 25 returns an error signal to the smartphone 11 via the relay server 20.

In the cooperation processing system 1 according to the embodiment, by restricting access to the electronic device that is connected to the network N3 by using the password information, an unauthorized user who does not know the password information can be prevented from accessing an electronic device.

Additionally or alternatively, in the cooperation processing system 1 according to the embodiment, the smartphone 11 can be restricted from accessing an electronic device, such as the projector 12A, in the following manner. For example, for a case of accessing an electronic device, such as the projector 12A, that is connected to the network N3 from the smartphone 11 of FIG. 1, a location information based authentication process can be executed. Here, the example of the access restriction is also explained by using the sequence diagram of FIG. 11.

At step S2 of FIG. 11, the file output request unit 42 of the smartphone 11 transmits a file output request, such as shown in FIG. 24, to the relay server 20. FIG. 24 is a diagram showing another example of information that is included in the file output request. The information of FIG. 24 that is included in the file output request includes location information, in addition to the information of FIG. 12 that is included in the file output request. The location information that is included in the file output request is information for specifying a location of the smartphone 11.

At step S4, the relay client 25 of the information storage device 10 receives the file output request of FIG. 24 from the relay server 20. The relay client 25 requests the authentication manager 26 to execute an authentication process with respect to the location information that is included in the file output request. The authentication manager 26 determines whether the location that is indicated by the location information is within a predetermined area. Here, the predetermined area can be set, for example, by an administrator in advance through the Web UI 24. The authentication manager 26 returns information indicating successful authentication to the relay client 25 if the location that is indicated by the location information is within the predetermined area, and the authentication manager 26 returns information indicating authentication failure to the relay client 25 if the location that is indicated by the location information is out of the predetermined area.

When the information indicating the successful authentication is returned, the relay client 25 executes the file output request with respect to the projector 12A that is specified by the device connection information of the file output request. When the information indicating the authentication failure is returned, the relay client 25 does not execute the file output request with respect to the projector 12A that is specified by the device connection information of the file output request. In this case, the relay client 25 returns an error signal to the smartphone 11 via the relay server 20.

In the cooperation processing system 1 according to the embodiment, by restricting access to the electronic device that is connected to the network N3 by using the location information, an unauthorized user who is not located at an assumed location, such as the conference room A, can be prevented from accessing an electronic device.

Additionally or alternatively, in the cooperation processing system 1 according to the embodiment, the smartphone 11 can be restricted from accessing an electronic device, such as the projector 12A, in the following manner. For example, for a case of accessing an electronic device, such as the projector 12A, that is connected to the network N3 from the smartphone 11 of FIG. 1, a time based authentication process can be executed. Here, the example of the access restriction is also explained by using the sequence diagram of FIG. 11.

At step S2 of FIG. 11, the file output request unit 42 of the smartphone 11 transmits a file output request, such as shown in FIG. 12, to the relay server 20. At step S4, the relay client 25 of the information storage device 10 receives the file output request from the relay server 20. The relay client 25 requests the authentication manager 26 to execute a time based authentication process.

The authentication manager 26 obtains information representing current time, and the authentication manager 26 determines whether the current time is within a predetermined time range or not. Here, the predetermined time range can be set, for example, by an administrator in advance through the Web UI 24. The authentication manager 26 returns information indicating successful authentication to the relay client 25 if the current time is within the predetermined time range, and the authentication manager 26 returns information indicating authentication failure to the relay client 25 if the current time is out of the predetermined time range.

When the information indicating the successful authentication is returned, the relay client 25 executes the file output request with respect to the projector 12A that is specified by the device connection information of the file output request. When the information indicating the authentication failure is returned, the relay client 25 does not execute the file output request with respect to the projector 12A that is specified by the device connection information of the file output request.

In this case, the relay client 25 returns an error signal to the smartphone 11 via the relay server 20.

In the cooperation processing system 1 according to the embodiment, by restricting access to the electronic device that is connected to the network N3 based on the time of access, access to the electronic device can be limited to a specified time period. Note that the above-described access restrictions with respect to the electronic device based on the password information, the location information, and the time of access can be combined and used.

As described above, in the cooperation processing system 1 according to the embodiment, an electronic device, such as the projector 12, can be controlled by the smartphone 11 through the network N1, such as a telephone line, even if the smartphone 11 may not be connected to the network N3 of a rental office or the like to which the electronic device is connected.

Additionally, in the cooperation processing system 1 according to the embodiment, a process, by a user, of inputting device information to the smartphone 11 can be omitted because the device information can be obtained from the short range radio device 15 that is installed in the vicinity of the electronic device, such as the projector 12.

As described above, in the cooperation processing system 1, when a user who is carrying the smartphone 11 approaches the electronic device, the smartphone 11 retrieves device information of the electronic device and the information storage device 10 by the short range radio. Thus, by using the retrieved device information of the electronic device and the information storage device 10, the smartphone 11 can control the electronic device via the relay server 20 and the information storage device 10.

The information processing system, the information processing device, and the device control method are explained above by the embodiments. However, the present invention is not limited to the embodiments, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict). The first network that is described in the claims may correspond to the network N1. The second network may correspond to the network N3. The terminal device may correspond to the smartphone 11. The information processing device may correspond to the information storage device 10. The information processing system may correspond to the cooperation processing system 1. The electronic device may correspond to the projector 12 or the like. The relay device may correspond to the relay server 20. The device information storage device may correspond to the short range radio device 15 or the like. The room may correspond to the conference room.

The device information retrieval unit may correspond to the device information retrieval unit 41. The receiver may correspond to the operation receiving unit 45. The output request unit may correspond to the file output request unit 42. The retrieval request unit may correspond to the file retrieval request unit 43. The request retrieval unit and the electronic data providing unit may correspond to the relay client 25. The authentication management unit may correspond to the authentication manager 26. Note that the file in the embodiment is a form of data.

The present application is based on and claims the benefit of priority of Japanese Priority Application No. 2014-183977 filed on Sep. 10, 2014, the entire contents of which are hereby incorporated herein by reference.

What is claimed is:

1. An information processing system comprising a plurality of terminal devices that are connected to a first network, and an information processing device that is connected to a second network that is different from the first network,
   wherein a first terminal device among the plurality of the terminal devices includes
   a first device information retrieval unit configured to retrieve device information of one or more electronic devices and device information of the information processing device from a device information storage device that stores the device information of the one or more electronic devices and the device information of the information processing device that are connected to the second network;
   a first receiver configured to receive, from a user, selection of one electronic device among the one or more electronic devices for which the device information is to be retrieved; and
   an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device,
   wherein a second terminal device among the plurality of terminal devices includes
   a second device information retrieval unit configured to retrieve the device information of the one or more electronic devices and the device information of the information processing device from the device information storage device;
   a second receiver configured to receive, from a user, selection of the one electronic device that is to output the electronic data based on the output request, among the one or more electronic devices for which the device information is retrieved; and
   a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device, and
   wherein the information processing device includes
   a request retrieving unit configured to retrieve, from the relay device, the output request for the electronic data that is addressed to the one electronic device and the retrieval request for the electronic data that is addressed to the one electronic device;
   an electronic device request unit configured to transmit, to the one electronic device, the retrieved output request for the electronic data that is addressed to the one electronic device, configured to transmit, to the one electronic device, the retrieved retrieval request for the electronic data that is addressed to the one electronic device, and configured to receive, from the one electronic device, the electronic data that is output from the one electronic device;
   an electronic data providing unit configured to provide the electronic data that is received from the one electronic device to the second terminal device; and
   an authentication management unit configured to execute an authentication process based on location information that is included in the retrieved output request or the retrieved retrieval request for electronic data that is addressed to the one electronic device,
   wherein, in response to determining that the authentication is successful, the authentication management unit is configured to transmit the output request or the retrieval request for the electronic data to the one electronic device, and
   wherein, in response to determining that the authentication has failed, the authentication management unit is configured not to transmit the output request or the retrieval request for the electronic data to the one electronic device.

2. The information processing system according to claim 1,
   wherein the device information storage device is configured to store, as the device information of the one or more electronic devices that are connected to the second network, identification information for identifying the one or more electronic devices and connection information for connecting to the one or more electronic devices through the first network, and the device information storage device is configured to store, as the device information of the information processing device that is connected to the second network, identification information for identifying the information processing device and connection information for connecting to the information processing device through the first network.

3. The information processing system according to claim 1,
   wherein the device information storage device is configured to provide, by a short range radio, the device information of the one or more electronic devices and the device information of the information processing device to the first terminal device and to the second terminal device.

4. The information processing system according to claim 1,
   wherein the device information storage device is installed in each room where the one or more electronic devices are installed that are connected to the second network.

5. The information processing system according to claim 1,
   wherein the device information storage device is installed in each of the one or more electronic devices and the information processing device that are connected to the second network.

6. The information processing system according to claim 1,
   wherein the information processing device includes an authentication management unit configured to execute an authentication process based on password information that is included in the retrieved output request or the retrieved retrieval request for electronic data that is addressed to the one electronic device, wherein, in response to determining that the authentication is successful, the authentication management unit is configured to transmit the output request or the retrieval request for the electronic data to the one electronic device, and wherein, in response to determining that the authentication has failed, the authentication management unit is configured not to transmit the output request or the retrieval request for the electronic data to the one electronic device.

7. The information processing system according to claim 1, wherein, in response to receiving a request from the information processing device, the relay device is configured to provide, to the information processing device, the output request for the electronic data that is addressed to the one electronic device and the retrieval request for the electronic data that is addressed to the one electronic device.

8. An information processing system comprising a plurality of terminal devices that are connected to a first network, and an information processing device that is connected to a second network that is different from the first network, wherein a first terminal device among the plurality of the terminal devices includes a first device information retrieval unit configured to retrieve device information of one or more electronic devices and device information of the information processing device from a device information storage device that stores the device information of the one or more electronic devices and the device information of the information processing device that are connected to the second network;

a first receiver configured to receive, from a user, selection of one electronic device among the one or more electronic devices for which the device information is to be retrieved; and an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device, wherein a second terminal device among the plurality of terminal devices includes a second device information retrieval unit configured to retrieve the device information of the one or more electronic devices and the device information of the information processing device from the device information storage device;

a second receiver configured to receive, from a user, selection of the one electronic device that is to output the electronic data based on the output request, among the one or more electronic devices for which the device information is retrieved; and a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device, and wherein the information processing device includes a request retrieving unit configured to retrieve, from the relay device, the output request for the electronic data that is addressed to the one electronic device and the retrieval request for the electronic data that is addressed to the one electronic device;

an electronic device request unit configured to transmit, to the one electronic device, the retrieved output request for the electronic data that is addressed to the one electronic device, configured to transmit, to the one electronic device, the retrieved retrieval request for the electronic data that is addressed to the one electronic device, and configured to receive, from the one electronic device, the electronic data that is output from the one electronic device; and an electronic data providing unit configured to provide the electronic data that is received from the one electronic device to the second terminal device, wherein the information processing system includes an authentication management unit configured to execute an authentication process based on time information that is included in the retrieved output request or the retrieved retrieval request for electronic data that is addressed to the one electronic device, wherein, in response to determining that the authentication is successful, the authentication management unit is configured to transmit the output request or the retrieval request for the electronic data to the one electronic device, and wherein, in response to determining that the authentication has failed, the authentication management unit is configured not to transmit the output request or the retrieval request for the electronic data to the one electronic device.

9. An information processing device that is connected to a second network that is different from a first network to which a plurality of terminal devices are connected, wherein a first terminal device among the plurality of the terminal devices includes a first device information retrieval unit configured to retrieve device information of one or more electronic devices and device information of the information processing device from a device information storage device that stores the device information of the one or more electronic devices and the device information of the information processing device that are connected to the second network;

a first receiver configured to receive, from a user, selection of one electronic device among the one or more electronic devices for which the device information is to be retrieved; and an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device, wherein a second terminal device among the plurality of terminal devices includes
a second device information retrieval unit configured to retrieve the device information of the one or more electronic devices and the device information of the information processing device from the device information storage device;
a second receiver configured to receive, from a user, selection of the one electronic device that is to output the electronic data based on the output request, among the one or more electronic devices for which the device information is retrieved; and
a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device, and
wherein the information processing device includes
a request retrieving unit configured to retrieve, from the relay device, the output request for the electronic data that is addressed to the one electronic device and the retrieval request for the electronic data that is addressed to the one electronic device;
an electronic device request unit configured to transmit, to the one electronic device, the retrieved output request for the electronic data that is addressed to the one electronic device, configured to transmit, to the one electronic device, the retrieved retrieval request for the electronic data that is addressed to the one electronic device, and configured to receive, from the one electronic device, the electronic data that is output from the one electronic device;
an electronic data providing unit configured to provide the electronic data that is received from the one electronic device to the second terminal device; and
an authentication management unit configured to execute an authentication process based on location information that is included in the retrieved output request or the retrieved retrieval request for electronic data that is addressed to the one electronic device,
wherein, in response to determining that the authentication is successful, the authentication management unit is configured to transmit the output request or the retrieval request for the electronic data to the one electronic device, and
wherein, in response to determining that the authentication has failed, the authentication management unit is configured not to transmit the output request or the retrieval request for the electronic data to the one electronic device.

10. A device control method that is to be executed by an information processing device that is connected to a second network that is different from a first network to which a plurality of terminal devices are connected,
wherein a first terminal device among the plurality of the terminal devices includes
a first device information retrieval unit configured to retrieve device information of one or more electronic devices and device information of the information processing device from a device information storage device that stores the device information of the one or more electronic devices and the device information of the information processing device that are connected to the second network;
a first receiver configured to receive, from a user, selection of one electronic device among the one or more electronic devices for which the device information is to be retrieved; and
an output request unit configured to transmit, by using the device information of the one electronic device, the selection of which is received from the user, and by using the device information of the information processing device, an output request for electronic data that is addressed to the one electronic device to the information processing device through a relay device that is connected to the one electronic device and that is connected to the information processing device,
wherein a second terminal device among the plurality of terminal devices includes
a second device information retrieval unit configured to retrieve the device information of the one or more electronic devices and the device information of the information processing device from the device information storage device;
a second receiver configured to receive, from a user, selection of the one electronic device that is to output the electronic data based on the output request, among the one or more electronic devices for which the device information is retrieved; and
a retrieval request unit configured to transmit a retrieval request for the electronic data that is addressed to the one electronic device, by using the device information of the one electronic device, the selection of which is received from the user, and by using the device information of the information processing device, to the information processing device through the relay device that is connected to the second terminal device and that is connected to the information processing device, and configured to retrieve the electronic data that is output from the one electronic device through the relay device, and
wherein the device control method includes
retrieving, from the relay device, the output request for the electronic data that is addressed to the one electronic device;
transmitting, to the one electronic device, the retrieved output request for the electronic data that is addressed to the one electronic device;
retrieving, from the relay device, the retrieval request for the electronic data that is addressed to the one electronic device;
transmitting, to the one electronic device, the retrieved retrieval request for the electronic data that is addressed to the one electronic device, and receiving, from the one electronic device, the electronic data that is output from the one electronic device;
providing the electronic data that is provided by the one electronic device to the second terminal device; and
executing an authentication process based on location information that is included in the retrieved output request or the retrieved retrieval request for electronic data that is addressed to the one electronic device,
wherein, in response to determining that the authentication is successful, the information processing device transmits the output request or the retrieval request for the electronic data to the one electronic device, and wherein, in response to determining that the authentication has failed, the information processing device does not transmit the output request or the retrieval request for the electronic data to the one electronic device.

* * * * *